US008150959B1

(12) United States Patent
Bezdicek et al.

(10) Patent No.: US 8,150,959 B1
(45) Date of Patent: Apr. 3, 2012

(54) SYSTEMS AND METHODS FOR NOTIFYING MULTIPLE HOSTS FROM AN INDUSTRIAL CONTROLLER

(75) Inventors: Jan Bezdicek, Prelouc (CZ); Kenwood H. Hall, Hudson, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 872 days.

(21) Appl. No.: 10/990,432

(22) Filed: Nov. 17, 2004

Related U.S. Application Data

(63) Continuation-in-part of application No. 10/860,870, filed on Jun. 4, 2004, now Pat. No. 7,721,273.

(60) Provisional application No. 60/520,699, filed on Nov. 17, 2003.

(51) Int. Cl.
*G06F 15/173* (2006.01)

(52) U.S. Cl. ....................................... 709/224

(58) Field of Classification Search .................. 709/224, 709/203
See application file for complete search history.

(56) References Cited

U.S. PATENT DOCUMENTS

| 4,975,865 | A | 12/1990 | Carrette |
| 5,131,092 | A | 7/1992 | Sackman et al. |
| 5,997,167 | A | 12/1999 | Crater et al. |
| 6,105,072 | A * | 8/2000 | Fischer ................... 719/315 |
| 6,138,049 | A * | 10/2000 | McLaughlin ............... 700/67 |
| 6,289,252 | B1 | 9/2001 | Wilson et al. |
| 6,321,272 | B1 | 11/2001 | Swales |
| 6,414,594 | B1 | 7/2002 | Guerlain |
| 6,505,247 | B1 * | 1/2003 | Steger et al. ............... 709/224 |
| 6,782,351 | B2 | 8/2004 | Reichel |
| 6,788,980 | B1 | 9/2004 | Johnson |
| 6,947,917 | B1 | 9/2005 | Mathur et al. |
| 6,999,992 | B1 * | 2/2006 | Deen et al. ................. 709/206 |
| 7,065,714 | B1 | 6/2006 | Theel et al. |
| 7,096,465 | B1 | 8/2006 | Dardinski et al. |

(Continued)

FOREIGN PATENT DOCUMENTS

EP 1414215 A 4/2004

(Continued)

OTHER PUBLICATIONS

European Search Report dated Nov. 23, 2006 for European Patent Application Serial No.05 025 163.6-1239, 3pages.*

(Continued)

*Primary Examiner* — John MacIlwinen
(74) *Attorney, Agent, or Firm* — Turocy & Watson, LLP; Scott Speroff; John M. Miller

(57) ABSTRACT

The subject invention facilitates alert notification in an industrial environment. The systems and methods enable subscribing devices, such as hosts, to receive events and/or alarms associated with industrial controllers. In addition, a subscribed component can unsubscribe, refresh notification related information, and/or acknowledge a notification. The foregoing can be achieved through a set of objects (e.g., notify objects) that implement a notification and dynamic subscription process. A host system can instantiate an associated notify object, subscribe to an event, and be notified about the event. The invention enables multiple hosts to subscribe to the same event, allows each host to select events of interest, and enables the events to be queued if the events occur faster than can be sent. In one aspect of the invention, the systems and methods can be utilized with an event and alarm infrastructure that is applicable on a Control and Information Protocol (CIP).

21 Claims, 19 Drawing Sheets

U.S. PATENT DOCUMENTS

| | | | |
|---|---|---|---|
| 7,242,991 B2 * | 7/2007 | Budinger et al. | 700/95 |
| 7,290,030 B2 * | 10/2007 | Edwards | 709/203 |
| 2002/0012321 A1 * | 1/2002 | Rune et al. | 370/252 |
| 2002/0012323 A1 | 1/2002 | Petite | |
| 2002/0029266 A1 * | 3/2002 | Tse et al. | 709/224 |
| 2003/0009711 A1 | 1/2003 | Kuhn et al. | |
| 2003/0050986 A1 * | 3/2003 | Matthews et al. | 709/206 |
| 2003/0115122 A1 * | 6/2003 | Slater et al. | 705/35 |
| 2003/0196122 A1 * | 10/2003 | Wesinger et al. | 713/201 |
| 2004/0153552 A1 * | 8/2004 | Trossen et al. | 709/229 |
| 2005/0073402 A1 * | 4/2005 | Denyer | 340/500 |
| 2005/0187987 A1 * | 8/2005 | Lim | 707/202 |
| 2005/0237183 A1 | 10/2005 | Lamb | |

FOREIGN PATENT DOCUMENTS

| | | |
|---|---|---|
| WO | 0199078 A | 12/2001 |
| WO | 03103264 A | 12/2003 |

OTHER PUBLICATIONS

Byres, Eric. Shoot-out at the Ethernet collal. Instrument Society of America. http://findarticles.com/p/articles/mi_qa3739/is_200102/ai_n8951097/print. Feb. 2001.*

European Search Report dated Nov. 23, 2006 for European Patent Application Serial No. 05 025 163.6-1239, 3 Pages.

OA mailed Oct. 1, 2008 for U.S. Appl. No. 10/860,870, 29 pages.

OA mailed Feb. 3, 2009 for U.S. Appl. No. 10/860,870, 30 pages.

* cited by examiner

SYSTEMS AND METHODS FOR NOTIFYING MULTIPLE HOSTS FROM AN INDUSTRIAL CONTROLLER

RELATED APPLICATION

This application is a Continuation-In-Part application of U.S. patent application Ser. No. 10/860,870 filed Jun. 4, 2004 now U.S. Pat. No. 7,721,273 and entitled "CONTROLLER EQUIPMENT MODEL SYSTEMS AND METHODS" which claims the benefit of U.S. Provisional Patent Application Ser. No. 60/520,699 filed Nov. 17, 2003 and entitled "LOGIX EQUIPMENT MODEL SYSTEMS AND METHODS." The entireties of the above-noted applications are incorporated by reference herein.

TECHNICAL FIELD

The present invention generally relates to industrial control systems, and more particularly, to systems and methods that notify one or more hosts from controllers in an industrial controller environment.

BACKGROUND OF THE INVENTION

Industrial controllers (e.g., Programmable Logic Controllers, or PLCs) are special purpose processing devices used for controlling (e.g., automated and semi-automated) industrial processes, machines, manufacturing equipment, plants, and the like. A typical controller executes a control program or routine in order to measure one or more process variables or inputs representative of the status of a controlled process and/or effectuate outputs associated with control of the process. Such inputs and outputs can be digital and/or analog, assuming a continuous range of values. A typical control routine can be created in a controller configuration environment that has various tools and interfaces whereby a developer can construct and implement a control strategy using industrial and conventional programming languages or graphical representations of control functionality. Such control routine can be downloaded from the configuration system into one or more controllers for implementation of the control strategy in controlling a process or machine.

Measured inputs received from a controlled process and outputs transmitted to the process can pass through one or more input/output (I/O) modules in a control system. Such modules can serve in the capacity of an electrical interface between the controller and the controlled process and can be located local or remote from the controller. Inputs and outputs can be recorded in an I/O memory. The input values can be asynchronously or synchronously read from the controlled process by one or more input modules and output values can be written directly to memory by a processor for subsequent communication to the process by specialized communications circuitry. An output module can interface directly with a controlled process by providing an output from memory to an actuator such as a motor, drive, valve, solenoid, and the like.

During execution of the control routine, values of the inputs and outputs exchanged with the controlled process can pass through memory. The values of inputs in memory can be asynchronously or synchronously updated from the controlled process by dedicated and/or common scanning circuitry. Such scanning circuitry can communicate with input and/or output modules over a bus on a backplane or network. The scanning circuitry can also asynchronously or synchronously write values of the outputs in memory to the controlled process. The output values from the memory can be communicated to one or more output modules for interfacing with the process. Thus, a controller processor can simply access the memory rather than needing to communicate directly with the controlled process.

In distributed control systems, controller hardware configuration can be facilitated by separating the industrial controller into a number of control elements, each of which performs a different function. Particular control modules needed for the control task can then be connected together on a common backplane within a rack and/or through a network or other communications medium. The control modules can include processors, power supplies, network communication modules, and I/O modules exchanging input and output signals directly with the controlled process. Data can be exchanged between modules using a backplane communications bus, which can be serial or parallel, or via a network. In addition to performing I/O operations based solely on network communications, smart modules exist which can execute autonomous logical or other control programs or routines. Various control modules of a distributed industrial control system can be spatially distributed along a common communication link in several locations. Certain I/O modules can thus be located proximate a portion of the controlled equipment, and away from the controller. Data can be communicated with these remote modules over a common communication link, or network, wherein all modules on the network communicate via standard communication protocols.

In a typical distributed control system, one or more I/O modules are provided for interfacing with a process. The outputs derive their control or output values in the form of a message from a master or peer device over a network or a backplane. For example, an output module can receive an output value from a processor via a communications network or a backplane communications bus. The desired output value is generally sent to the output module in a message. The output module receiving such a message will provide a corresponding output (analog or digital) to the controlled process. Input modules measure a value of a process variable and report the input values to another device over a network or backplane. The input values can be used by a processor for performing control computations.

In such systems, alerts can be generated in the controller and conveyed to particular host systems. Such alerts can be defined in the controller and raised under particular conditions. Conventional techniques utilized to notify a host system when an alert occurs include polling and messaging. With polling, the host periodically or continuously polls the controller and determines when an alert occurs at the host. Such polling consumes bandwidth and, thus, this technique can increase bandwidth consumption, which can decrease performance and increase delay times. With messaging, the controller determines when an event occurs and transmits an alert notification to the host. The technique increases complexity by requiring the controller to know host addresses ahead of time. In addition, when host configuration changes or new host systems is added, the controller has to be updated with the updated or new host configuration and addresses.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention provides systems and methods that facilitate providing a subscriber with alert information, wherein a subscriber is a device that is capable of receiving and treating alerts and an alert is any possible instantaneous occurrence detectable by a publisher that can be of interest to one or more subscribers. In one example, the subscriber can be a host system and the alert can be a state, related information, an acknowledgment, an event or alarm associated with an industrial controller. Such alert can be an instantaneous occurrence that is significant to the host system and/or other application and the alarm can be an alert that is deemed abnormal and that requires special attention and handling.

As noted above, in conventional systems a host typically obtains alert information through polling and messaging techniques, wherein the host periodically or continuously polls the controller and determines the occurrence of an alert at the host or the controller determines the occurrence of the alert and transmits a message instruction to the host to notify the host of the alert. Such techniques commonly require the controller to know host's addresses ahead of time such that the controller can include a configuration and specific address of a destination host in an instruction. The systems and methods described herein can mitigate the foregoing deficiencies with conventional alert notification systems. In general, this is achieved through a set of objects (e.g., notify objects) that implement a notification and dynamic subscription process. Alerts are defined in the controller through a combination of data table structures and user instructions and declared upon execution under selected conditions. A host system can instantiate an associated notify object, subscribe to an alert, and be notified about the alert The invention enables multiple hosts to subscribe to the same alert, allows each host to select alerts of interest, and enables the alerts to be queued if the alerts occur faster than can be sent. One of the advantages provided by the subject invention is that it does not require the controller to know the destination addresses of the host messages in advance. This makes it possible to build macros and reusable groups of instructions. With conventional systems, each time an alert detection instruction is inserted into the controller configuration and specific addresses of the host must be inserted into an appropriate instruction, which makes reusable blocks of code very difficult. With the subject invention, the configuration of which host systems would like to be notified about which alerts is established at run time. In general, the host systems create a notify object and subscribe to the alerts of interest. If the configuration or number of hosts is changed the controllers do not have to be modified or altered, which is an improvement over competing solutions, wherein each change in the host configuration required subsequent changes to the controller programs.

The subject invention can also provide the following improvements over conventional systems: improved efficiency, reduced bandwidth consumption, reduced complexity, and improved performance. For example, bandwidth can be reduced through eliminating the need to continually poll the controller and receive the same data in order to check for an alert condition. With the subject invention, a message is conveyed to the host(s) only when an alert is detected. In another example, complexity of configuring systems can be reduced by not requiring the controller to contain the addresses of the host systems, and the configuration of the host systems can be changed and new host systems added without any change to the controller. In yet another example, performance can be improved by reducing the delay between detection of an alert and notification of the host. In conventional systems, when the host polls the controller for data and detects an alert, the maximum response time, or delay from the alert occurring to alert detection, is the time of one poll. With the subject invention, the message is sent as soon as the alert is detected in the controller, which means that on average the delay will be much less than one poll time and in the worst case when all alerts occur at the same time, the delay will be no worse than the delay of a single poll. In addition, the subject invention enables multiple alerts to be combined into a single packet, which can increase efficiency over systems that use message instructions with specific addresses to deliver alerts.

In one aspects of the invention, a system that includes a subscription component, a notification component, and an interface component is provided. The subscription component is utilized to accept requests for alert notifications, for example, from a subscribing system such as a host. The interface component provides a communications mechanism to receive alert notifications for distribution by the notification component, which distributes the alert notifications to subscribers. In one instance, the subscription component, the notification component, and the interface component can be implemented as an object (e.g., a notify object), wherein instances of the object can be initiated by one or more subscribers subscribing to receive alert notifications. By way of example, a host can instantiate an instance and subscribe via the subscription component to be notified when an alert occurs. Such alert can be associated with an entity such as an industrial controller and defined through a combination of data table structures and user instructions, wherein the alert can be declared upon execution under selected conditions. The system can further be utilized to unsubscribe from being notified when the alert occurs.

In another aspect of the invention, the system is employed in connection with an alert and subscription architecture. Such architecture can be designed and layered for utilization with the alarms and alerts features and/or other features that support such communication. In one instance, the system is utilized with an alert and alarm infrastructure that is applicable on a Control and Information Protocol (CIP). Such infrastructure can be a three-layer architecture, with a CIP Layer that corresponds to specification of the Control and Information Protocol; a CIP Dynamic Publisher/Subscriber Layer that defines general dynamic publisher/subscriber mechanisms that allow an arbitrary set of devices (subscribers) to register themselves to be notified about information published by another device (publisher); and a CIP Notification Layer that specifies behavior of notifications such as CIP alarms and alerts. The infrastructure can allow devices supporting the CIP protocol to be notified about occurrence of some specific alerts (e.g., events, alarms, state, acknowledgments, messages, information, etc.) generally called alerts published by a CIP publisher. Consequently, CIP alert publishers can send alert data to registered CIP subscribers. The infrastructure also provides services which allow subscribers to register and acknowledge (if necessary) alerts published by CIP publisher, and to obtain their current status.

In yet other aspects of the invention, exemplary state diagram are provided that reflects a notify object's behavior. In one instance, the state diagram provides general states and behavior, and in another instance the diagram is associated with a digital alarm. In still other aspects of the invention, various Graphical User Interfaces, instructions, and methods are provided.

The following description and the annexed drawings set forth in detail certain illustrative aspects of the invention.

These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
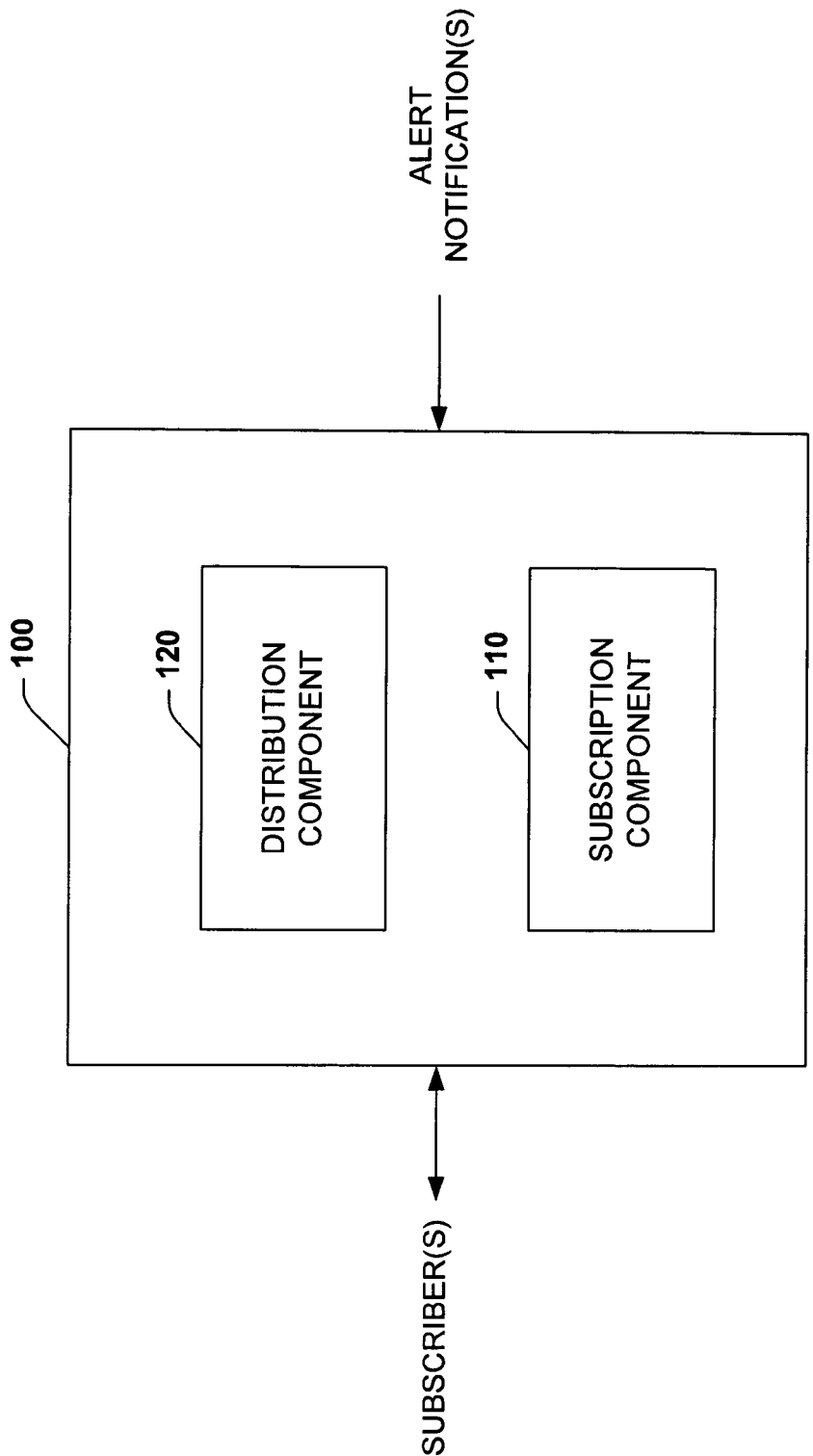
FIG. 1 illustrates a system that facilitates alert notification.

The subject invention relates to systems and methods that facilitate alert notification in an industrial control environment. The systems and methods enable subscribing devices, such as hosts, to receive alerts associated with industrial controllers. Suitable alerts include phase manager state changes, events, alarms, alert notification related information, alert notification acknowledgments, etc. The foregoing can be achieved through a set of objects (e.g., notify objects, subscription objects, alert objects, etc.) that form a notification and dynamic subscription process. By way of example, a subscribing system can instantiate an instance of a notify object, subscribe through an instance of a subscription object to receive an alert generated by an alert object and subsequently be notified about that alert when it occurs. The invention enables multiple subscribers to subscribe to the same alert, allows each subscriber to select alerts of interest, and enables the alerts to be queued if the alerts occur faster than they can be sent. One advantage of the subject invention over conventional systems is that it does not require the controller to know a destination address of the subscriber system in advance. This makes it possible to build macros and reusable groups of instructions, reduce bandwidth consumption, which can improve performance, and reduce complexity. Moreover, if the configuration or number of subscribers is changed the controllers do not have to be modified or altered. Another advantage of the subject invention over conventional systems is reduced delay between detection of an alert and notification of the subscriber since an alert notification is sent as soon as the alert is detected in the controller. In addition, the subject invention enables multiple alerts to be combined into a single packet, which can increase efficiency over systems that use message instructions with specific addresses to deliver alerts.

The term "alert" generally refers to any possible instantaneous occurrence detectable by a publisher that can be of interest of one or more subscribers; the term "subscriber" refers to a device capable of receiving and treating alerts; and the term "publisher" refers to a device capable of detecting and informing interested subscribers about Alerts. In addition, the terms such as "component," "model," "object," and variations thereof are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers (e.g., via data packets and signals between the computers), industrial controllers, and/or modules communicating therewith.

FIG. 1 illustrates a system 100 for subscripting to receive alert notifications. The system 100 includes a subscription component 110 that accepts requests for alert notifications and a distribution component 120 that receives and conveys alert notifications to subscribers. It is to be appreciated that the distribution component 120 can be considered a general dynamic publisher mechanism.

In one aspect of the invention, the system 100 can be implemented as an object (e.g., a notify object as described herein), wherein respective instances of the object can be initiated by one or more subscribers subscribing to receive alert notifications. By way of example, a subscriber, such as a host, can instantiate an instance of the system 100 and subscribe via the subscription component 110 to be notified when an alert occurs. Such alerts can be associated with an industrial controller and defined through a combination of data table structures and user instructions, wherein the alert can be declared upon execution under selected conditions. When the alert occurs, a message or other notification can be conveyed to the system 100 and provided to the subscriber by the distribution component 120. The system 100 can further be utilized to unsubscribe from a subscription to receive an alert notification.

It is to be appreciated that the system 100 can be employed in connection with an alert and subscription architecture, for example, as described in connection with FIG. 16. Such architecture can be designed and layered for utilization with the alarms and events features and/or other features that support such communication. In one aspect, the system 100 can be used for a variety of applications such as a part of an overall event and alarm infrastructure that is applicable on a Control and Information Protocol (CIP) or other industrial network device. One layer of this architecture can be a CIP Layer that corresponds to specification of the Control and Information Protocol. Another layer of this architecture can be a CIP Dynamic Publisher/Subscriber Layer that defines general dynamic publisher/subscriber mechanisms that allow an arbitrary set of devices (subscribers) to register themselves to be notified about information published by another device (publisher). Still another layer of this architecture can be a CIP Notification Layer that specifies behavior of notifications such as CIP alerts. This layer typically utilizes the CIP dynamic publisher subscriber mechanism for delivery of information about current states of CIP alerts to subscribers.

The infrastructure can allow devices supporting the CIP protocol to be notified about occurrence of some specific events generally called alerts published by a CIP publisher. Consequently, CIP alert publishers can send alert data to registered CIP subscribers. The infrastructure also provides services which allow subscribers to register and acknowledge (if necessary) alerts published by CIP publisher, and to obtain their current status. As noted previously, an alert is a general abstract term representing a possible occurrence detectable by a publisher which can be of interest to subscribers. Generally, publisher/subscriber communication is based on a model where nodes are publishing and subscribing to data. A network device can be a publisher, a subscriber, or both, and a publisher can send the same data to many registered subscribers.

Figure 2:
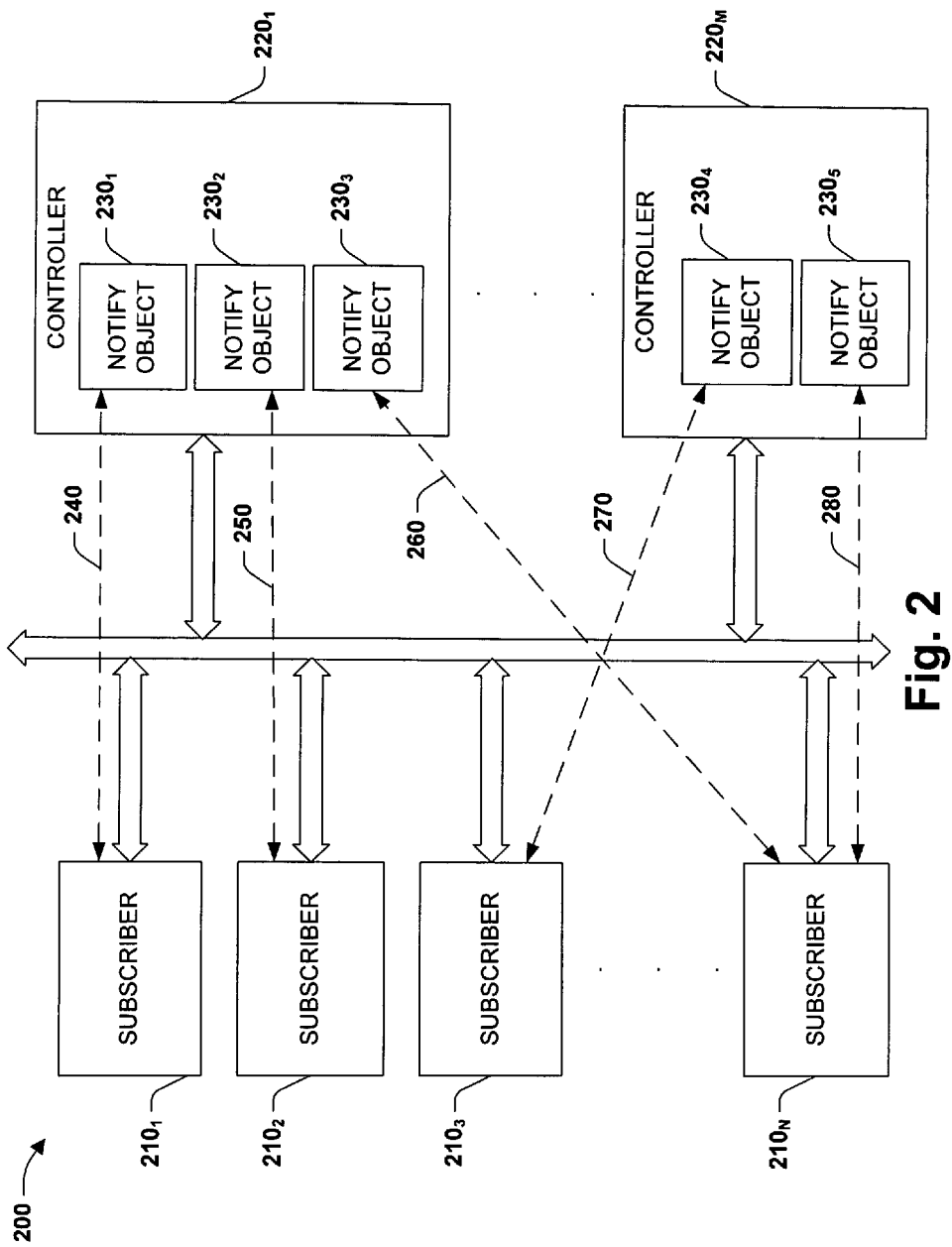
FIG. 2 illustrates a system that employs notify objects to manage alert notifications within an industrial environment.

FIG. 2 illustrates a system 200 that employs notify objects to manage alert notifications within an industrial environment. As noted in connection with system 100 of FIG. 1, a notify object can provide mechanisms that enable a host to subscribe to receive an alert notification and to receive the alert notification when the associated alert occurs. It is to be appreciated that the notify object employed herein can be a CIP object utilized with an alert and subscription architecture as described above. The system 200 includes a plurality of hosts $210_1$, $210_2$, $210_3$, . . . , $210_N$, wherein N is an integer equal to or greater than one. Collectively, the hosts $210_1$, $210_2$, $210_3$, . . . , $210_N$ can be referred to as hosts 210. Individual hosts 210, including more than one of the hosts 210, can subscribe to be notified when a particular alert occurs in connection with an industrial controller. By way of example, one of the hosts 210 can subscribe to receive an alert notification when a particular alert occurs in connection with a controller from a plurality of controllers $220_1$, . . . , $220_M$ (wherein M is an integer equal to or greater than one). The plurality of controllers $220_1$, . . . , $220_M$ can collectively be referred to as controllers 220.

The subscription can be through an associated notify object. For example, the host $210_1$ can instantiate an instance of a notify object $230_1$ residing within the controller $220_1$ and employ the instance to subscribe to be notified when an alert associated with the controller $220_1$ occurs. This subscription is depicted by the dashed line at reference numeral 240. In addition, the subscription can be configured such that a notification is received only for particular alerts (e.g., alerts of interest). When multiple alerts occur, the alerts can be queued, for example, when the alerts occur faster than they can be sent. It is to be understood that this example is illustrative and does not limit the invention. For example, any of the hosts 210 can instantiate a notify object to subscribe to receive alert notifications associated with an industrial controller. By way of example, the host $210_2$ can instantiate a notify object $230_2$ and employ an instance thereof to subscribe to receive an alert notification from the controller $220_1$. This subscription is depicted by the dashed line at reference numeral 250. A subscription between the host $210_3$ and a notify object $230_4$ is illustrated by the dashed line at reference numeral 260, wherein the host $210_3$ instantiates an instance of the object $230_4$ and employs this instance to subscribe to receive an alert notification from the controller $220_M$. The host $210_N$ can instantiate a notify object $230_3$ to subscribe to receive an alert notification associated with the controller $220_1$ (as illustrated by the dashed line at 270) and a notify object $230_5$ to subscribe to receive an alert notification associated with the controller $220_M$ (as illustrated by the dashed line at 280). It is to be appreciated that the notify objects $230_1$, $230_2$, $230_3$, $230_4$, and $230_5$ can collectively be referred to as notify objects 230.

By employing the notify objects 230, the controllers 220 are not required to know destination addresses of the hosts 210. This makes it possible to build macros and reusable groups of instructions. With conventional systems, each time an alert detection instruction is inserted into the controller configuration and specific addresses of the host must be inserted into an appropriate instruction, which makes reusable blocks of code very difficult. By using the notify objects 230, host configuration can occur at run time. In addition, if the configuration or number of hosts 210 is changed the controllers 220 do not have to be modified or altered, which is an improvement over competing solutions, wherein each change in the host configuration required subsequent changes to the controller programs.

Moreover, the notify objects 230 can provide for improved efficiency, reduced bandwidth consumption, reduced complexity, and improved performance. For example, bandwidth can be reduced through eliminating the need to continually poll the controller and receive the same data in order to check for an alert condition and, instead, conveying an alert notification only when an alert is detected at the controllers 220. In another example, complexity of configuring systems can be reduced by not requiring the controllers 220 to contain host addresses. In yet another example, performance can be improved by reducing the delay between detection of an alert and notification of the host issuing notifications as soon as an alert is detected in the controller. Moreover, the notify objects 230 enable multiple alerts to be combined into a single packet, which can increase efficiency over systems that use message instructions with specific addresses to deliver alerts. It is to be appreciated that respective notify objects 230 can subscribe with one or more subscription objects (not shown) to receive alert notifications generated by corresponding alert objects (not shown) as described in connection with system 300 of FIG. 3.

Figure 3:
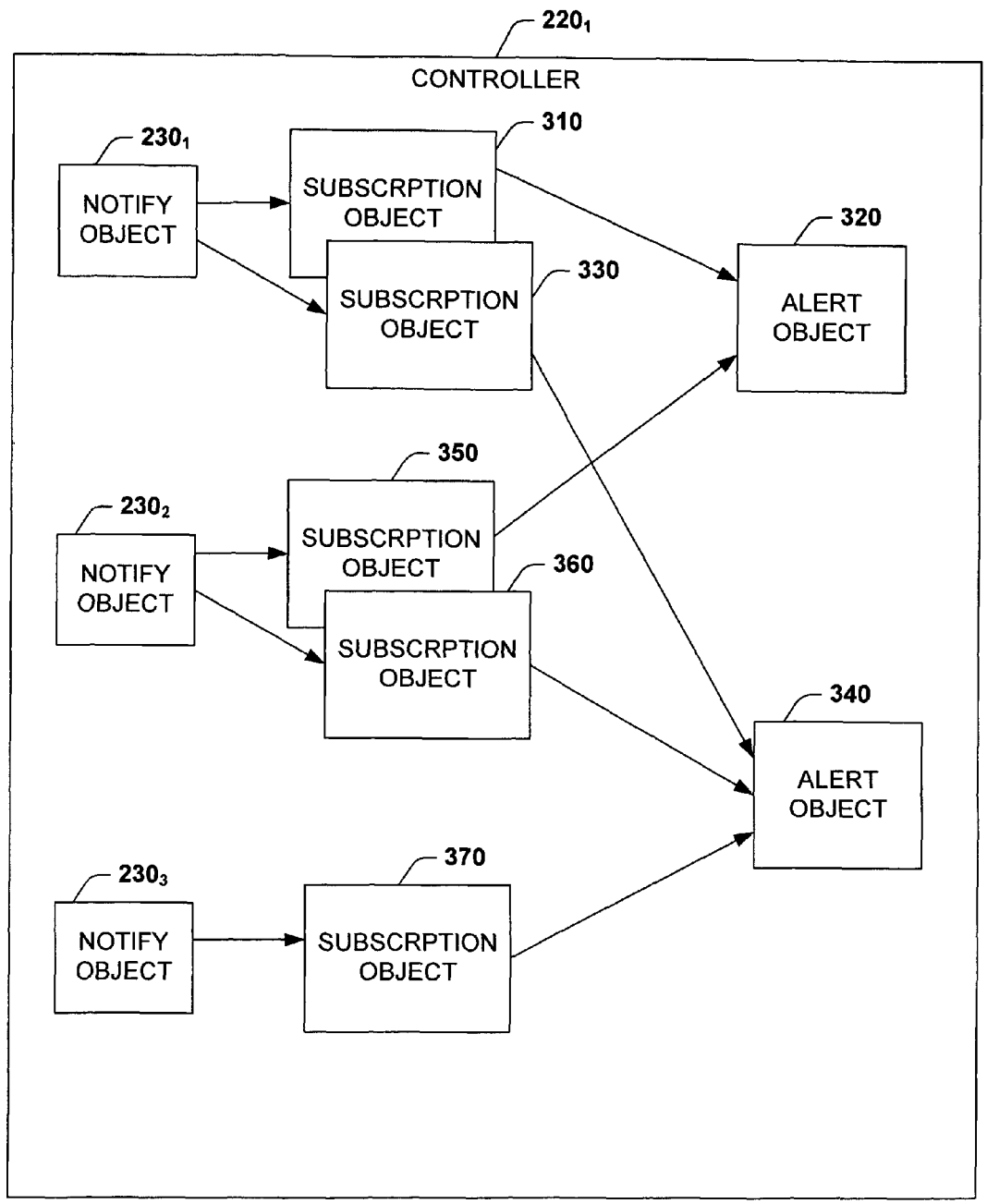
FIG. 3 illustrates notify objects subscribing with subscription objects to receive alerts from alert objects.

FIG. 3 illustrates a system 300 that includes the controller $220_1$ and the notify objects $230_1$-$230_3$ as described in connection with FIG. 2. As depicted, respective notify objects $230_1$-$230_3$ can subscribe through one or more subscription objects to receive one or more alerts generated by one or more alert objects. For example, the notify object $230_1$ can subscribe through a subscription object 310 to receive alert notifications generated by an alert object 320. In addition, the notify object $230_1$ can be concurrently subscribed with a subscription object 330 to receive alert notifications generated by an alert object 340. It is to be appreciated that the notify object $230_1$ can subscribe with essentially any number of subscription objects, for example, depending on the alert notifications it desires to receive. Moreover, the notify object $230_1$ can unsubscribe from one or more, including all, subscriptions. The notify object $230_2$ can be subscribed with a subscription object 350 to receive alert notifications generated by the alert object 320 and with a subscription object 360 to receive alert notifications generated by the alert object 340. Likewise, the notify object $230_2$ can subscribe with other subscription objects to receive alert notifications associated with other alert objects and unsubscribe from any of the subscriptions. The notify object $230_3$ can subscribe with a subscription object 370 to receive alert notifications generated by the alert object 340. As noted above, this figure is provided for exemplary purposes and does not limit the invention. Thus, more or less notify objects, subscription objects, and alerts objects may be employed in accordance with the invention. Moreover, any controller employing such objects can utilized this technique to subscribe and/or unsubscribe to receive alert notifications.

Figure 4:
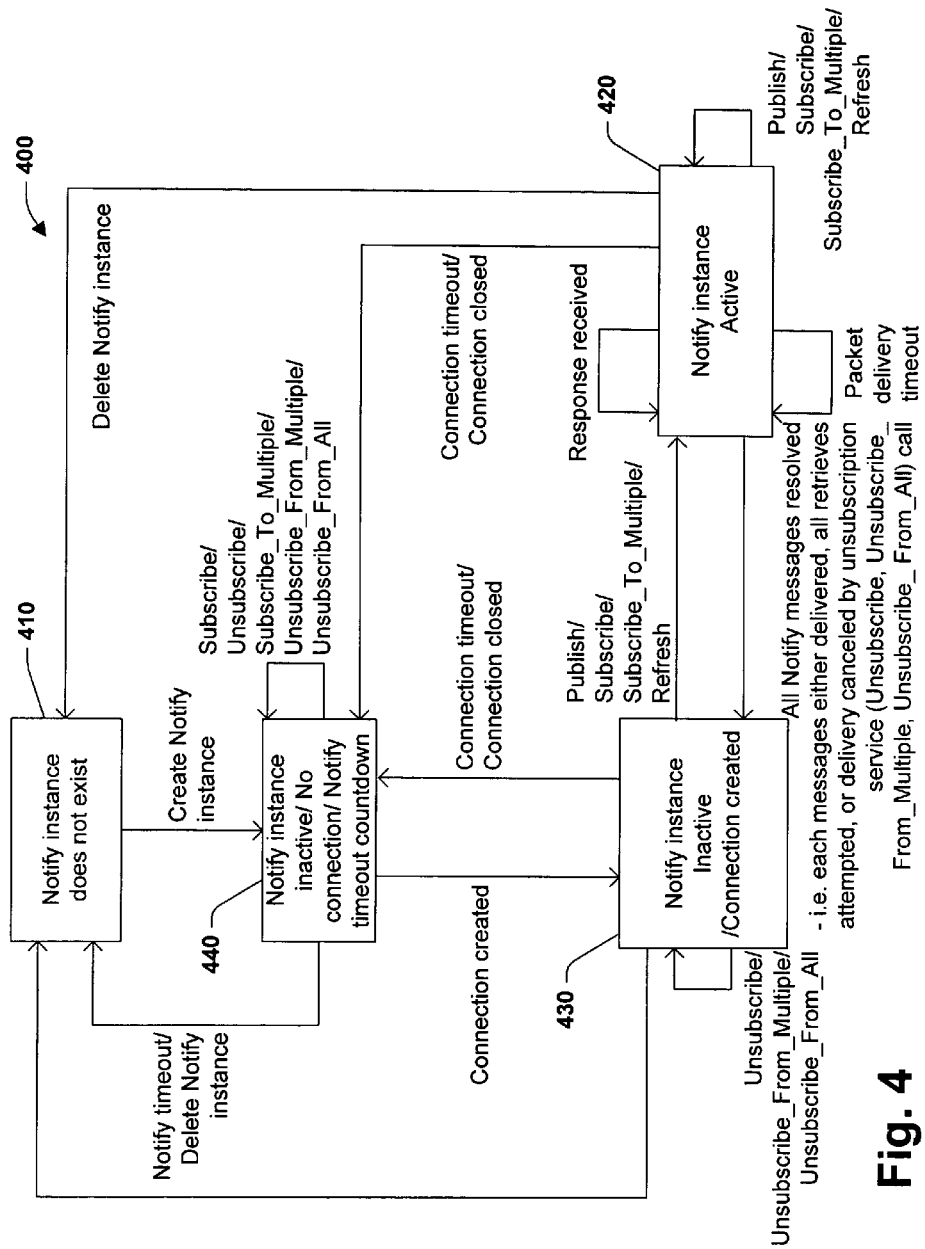
FIG. 4 illustrates an state diagram that reflects notify object general states and behavior.

FIG. 4 illustrates an exemplary state diagram 400 that reflects notify object general states and behavior. The state diagram 400 is depicted with four states; however, it is to be understood that in other aspects of the invention, more or less and/or similar or different states can be employed. The states depicted in FIG. 4 include a Notify Instance Does Not Exist state 410, a Notify Instance Active state 420, a Notify Instance Inactive/Connection Created state 430, and a Notify Instance Inactive/No Connection/Notify Timeout Countdown state 440. The states 410-440 interact amongst each other according to the state transitions illustrated and described in FIG. 4.

Figure 5:
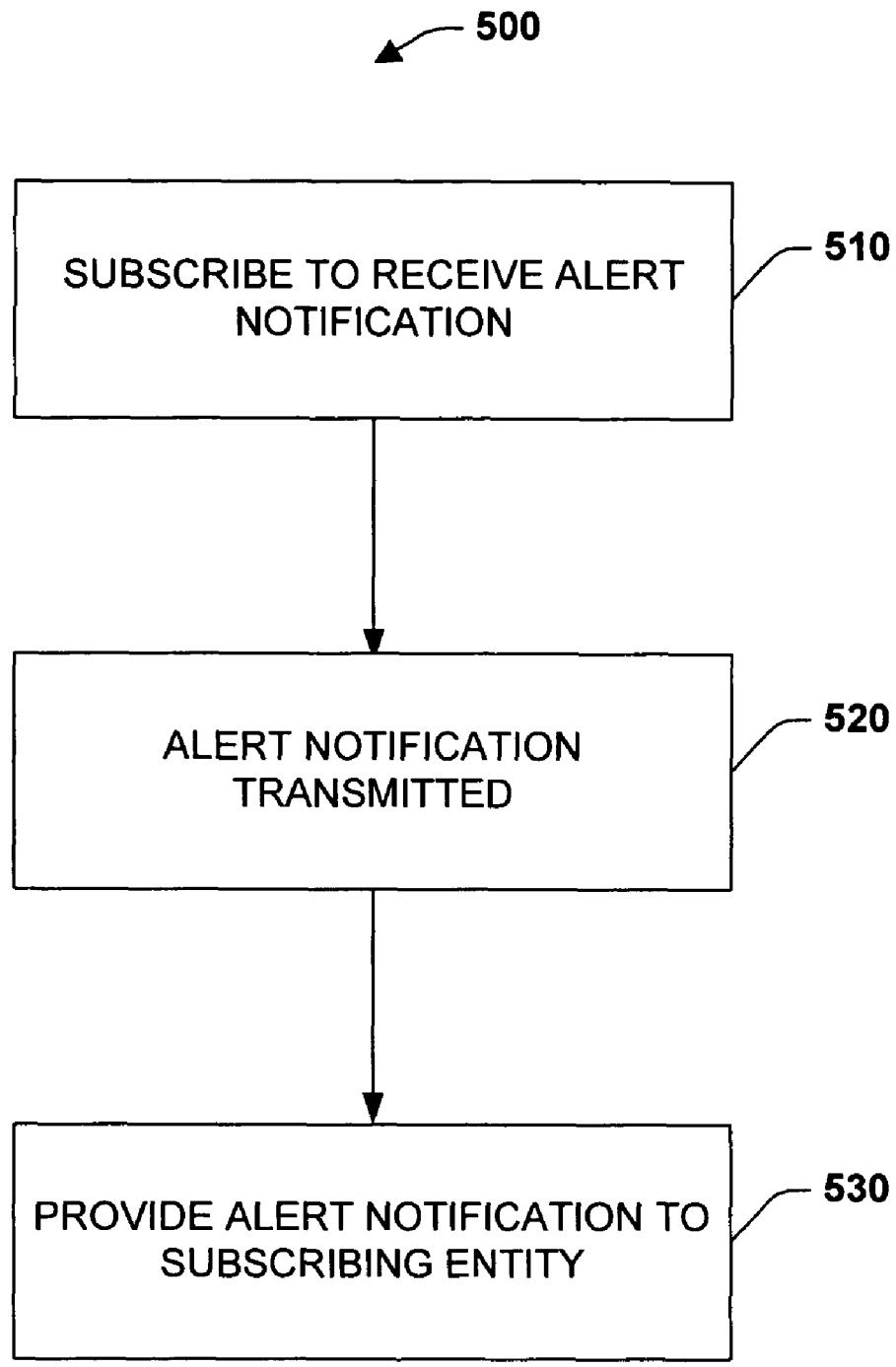
FIG. 5 illustrates an exemplary method for subscribing for and receiving alert notifications in an industrial environment.

FIG. 5 illustrates a method 500 for providing alert notifications to subscribing entities. At 510, a host or other subscribing entity subscribes to receive an alert notification. Such subscription can be for a particular alert associated with a particular industrial controller, for example. In addition, the alert can be an event, an alarm, a state change, an acknowledgment, a message, alert notification information, etc. At 520, an alert is declared in the industrial controller and a corresponding message is sent. In general, the alert can be associated with the industrial controller and defined through a combination of data table structures and user instructions, wherein the alert is declared upon execution under selected conditions. At reference numeral 530, the alert notification is provided to the subscribing host. Optionally, the host can unsubscribe from being notified when the alert occurs. It is to be appreciated that the method 500 can be employed in connection with any of the systems described herein. For example, the method can be implemented within a notify object and utilized with alarm and even infrastructures that support Control and Information Protocol (CIP) or other industrial network devices.

The following illustrate exemplary class attributes.

| Name | Description of Attribute |
|---|---|
| Revision | Revision of object class definition |
| Maximum Instance | Maximum Notify instance created |
| Number of Instances | Count of the number of Notify instances created |

The following illustrate exemplary instance attributes.

| Name | Description of Attribute |
|---|---|
| Notify Timeout | Specifies the amount of time (in number of milliseconds) after which the instance of the Notify object will be automatically deleted in the case that the connection to this Notify object instance was not opened or was closed. |
| Packet Delivery Timeout[1] | Specifies the amount of time (in number of milliseconds) for receipt of confirmation by the subscriber before a retry will be attempted. |
| Number of Retries[1] | Specifies how many times the Notify object instance will try to deliver the Alert packet when the first delivery fails. |
| Notify Configuration Bit Array | Specifies Notify object instance configuration. |

The following illustrate exemplary common services.

| Service Name | Description of Service |
|---|---|
| Get_Attributes_All | Returns the contents of all attributes of the class or instance. |
| Get_Attribute_List | Gets the specified attributes of the class or the instance. |
| Create | Creates new instance of Notify object. |
| Delete | Deletes the specified instance of Notify object. |

The following illustrate exemplary create requests.

| Name | Description of Attribute |
|---|---|
| Notify timeout | |
| Packet delivery timeout | |
| Number of retries | |
| Notify configuration bit array | |

The following illustrate exemplary create responses.

| Name | Description of Attribute |
|---|---|
| Instance created | The instance number of the Notify object that was created. |
| Notify unique key | Unique number generated by Notify object. Subscriber should use this number when opening connection to created Notify object instance. |

The following illustrate exemplary object specific services.

| Service Name | Description of Service |
|---|---|
| Refresh | Assures that alert status message is sent to subscriber via opened connection for every subscribed Alert successor object instance if there is not pending alert data message from the particular Alert object instance. |
| Acknowledge_Alert | Acknowledge particular alert identified by Alert type, Alert ID, and alert type specific additional parameters if specified by Alert successor object definition. |
| Unsubscribe_From_All | Unsubscribes subscriber from all Alert successor object instance(s). |

-continued

| Service Name | Description of Service |
| --- | --- |
| Subscribe | Subscribes subscriber as a receiver of alert messages of specified message type(s) from one Alert successor object instance. |
| Unsubscribe | Unsubscribes subscriber from Alert successor object instance. |
| Subscribe_To_Multiple | Subscribes subscriber as a receiver of alert messages of specified message type(s) from specified list of Alert success or object instances. |
| Unsubscribe_From_Multiple | Unsubscribes subscriber from all Alert successor object instances specified in the passed unsubscription list. |

The following illustrate exemplary acknowledge alert requests.

| Name | Description of Attribute |
| --- | --- |
| Alert type | Type of an Alert successor object instance which alert data message is acknowledged. |
| Alert ID | Unique identification of an Alert successor object instance which alert data message is acknowledged. |
| Alert type specific parameters | Additional parameters for this service can be specified by Alert object successor object. Addition parameters are specified by Alert successor object description. |

The following illustrate exemplary acknowledge alert responses.

| Name | Description of Attribute |
| --- | --- |
| Acknowledgement status | Acknowledgement subscription status. |
| Acknowledgement alert specific info | Alert successor object can specify more detail acknowledgement status information. Addition parameters are specified by Alert successor object description. |

The following illustrate exemplary subscribe requests.

| Name | Description of Attribute |
| --- | --- |
| Alert type | Type of an Alert successor object instance to which subscriber is subscribing. |
| Alert path length | Length of Alert EPATH in words. |
| Alert path | Unique identification of an Alert successor object instance to which subscriber is subscribing specified as an EPATH. |
| Message types selection | 32-bit array specifying which of alert data message types subscriber wants to be notified. Logical one on particular bit position means that subscriber wants to be notified about particular alert message type. Message types are defined by Alert successor objects. Each subscriber should subscribe at minimum to message type 0 (bit 0 should be set to 1) typically representing special status message, for details see "Dynamic Publisher/Subscriber Infrastructure for CIP Devices" specification. |
| Alert specific subscription parameters | There could be non or several additional parameters required by specific Alert successor object for subscription. These parameters have to be specified by Alert successor object definition. |

The following illustrate exemplary subscribe responses.

| Name | Description of Attribute |
| --- | --- |
| Alert subscription status | Alert subscription status. |
| Alert type | Type of an Alert successor object instance to which subscriber tried to subscribe. |
| Alert ID | Unique identification of an Alert successor object instance to which subscriber tried to subscribe. |
| Message types selection | 32-bit array specifying which of alert message types subscriber will be notified about. Logical one on particular bit position means that subscriber will be notified about particular alert data message type. Typically, subscriber should be subscribed at minimum to message type 0 (bit 0 should be set to 1), for details see "Dynamic Publisher/Subscriber Infrastructure for CIP Devices" specification. |

The following illustrate exemplary unsubscribe requests.

| Name | Description of Attribute |
| --- | --- |
| Alert type | Type of an Alert successor object instance from which subscriber is unsubscribing. |
| Alert ID | Unique identification of an Alert successor object instance from which subscriber is unsubscribing. |

The following illustrate exemplary unsubscribe responses.

| Name | Description of Attribute |
| --- | --- |
| Alert unsubscription status | Alert unsubscription status. |
| Alert type | Type of an Alert successor object instance from which subscriber tried to unsubscribe from. |
| Alert ID | Unique identification of an Alert successor object instance from which subscriber tried to unsubscribe from. |

The following illustrate exemplary subscribe to multiple requests.

| Name | Description of Attribute |
| --- | --- |
| Subscription List Size | Number of members in Subscription Member list |
| Subscription Member List | The subscription member list is an array of individual subscriptions |
| Alert type | Type of an Alert successor object instance to which subscriber is subscribing. |
| Alert path length | Length of Alert EPATH in words. |
| Alert path | Unique identification of an Alert successor object instance to which subscriber is subscribing specified as an EPATH |
| Message types selection | 32-bit array specifying which of alert data message types subscriber wants to be notified. Logical one on particular bit position means that subscriber wants to be notified about particular alert message type. Message types are defined by Alert successor objects. Each subscriber should subscribe at minimum to message type 0 (bit 0 should be set to 1) typically representing special status message, for details see "Dynamic Publisher/Subscriber Infrastructure for CIP Devices" specification. |

-continued

| Name | Description of Attribute |
|---|---|
| Alert specific subscription parameters | There could be non or several additional parameters required by specific Alert successor object for subscription. These parameters have to be specified by Alert successor object definition. |

The following illustrate exemplary subscribe to multiple responses.

| Name | Description of Attribute |
|---|---|
| Subscription List Size | Number of members in Subscription Member list |
| Subscription Member List | The subscription member list is an array of individual subscriptions |
| Alert subscription status | Alert subscription status. |
| Alert type | Type of an Alert successor object instance to which subscriber tried to subscribe. |
| Alert ID | Unique identification of an Alert successor object instance to which subscriber tried to subscribe. |
| Message types selection | 32-bit array specifying which of alert message types subscriber will be notified about. Logical one on particular bit position means that subscriber will be notified about particular alert message type. Typically, subscriber should be subscribed at minimum to message type 0 (bit 0 should be set to 1), for details see "Dynamic Publisher/Subscriber Infrastructure for CIP Devices" specification. |

The following illustrate exemplary unsubscribe from multiple requests.

| Name | Description of Attribute |
|---|---|
| Unsubscription List Size | Number of members in Unsubscription Member list |
| Unsubscription Member List | The unsubscription member list is an array of individual unsubscriptions. |
| Alert type | Type of an Alert successor object instance from which subscriber is unsubscribing. |
| Alert ID | Unique identification of an Alert successor object instance from which subscriber is unsubscribing. |

The following illustrate exemplary unsubscribe from multiple responses.

| Name | Description of Attribute |
|---|---|
| Unsubscription List Size | Number of members in Unsubscription Member list |
| Unsubscription Member List | The unsubscription member list is an array of individual unsubscriptions. |
| Alert unsubscription status | Alert unsubscription status. |
| Alert type | Type of an Alert successor object instance from which subscriber tried to unsubscribe from. |
| Alert ID | Unique identification of an Alert successor object instance from which subscriber tried to unsubscribe from. |

Figure 6:
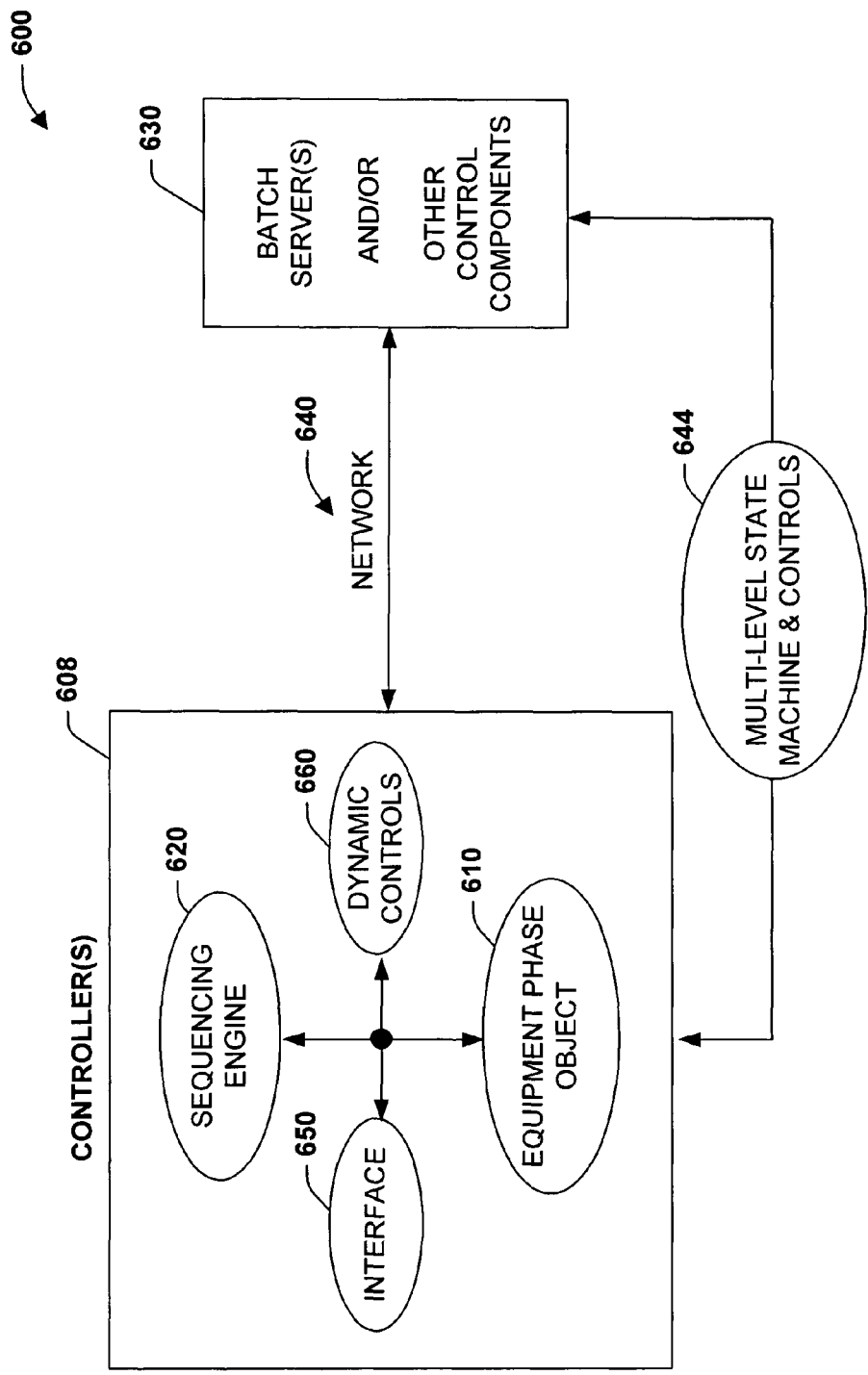
FIG. 6 is a schematic block diagram illustrates an equipment model and processing system in accordance with an aspect of the present invention.

FIG. 6 illustrates a system 600 illustrates an equipment model and processing system in accordance with an aspect of the present invention. The system 600 includes a controller 608 (or controllers) having an equipment phase object 610 that operates in conjunction with a sequencing engine 620 (or state machine) to facilitate automated industrial control operations. The object 610 and engine 620 support internal and/or external control operations and are provided as part of underlying execution functionality of the controller 608. For example, the sequencing engine 620 can execute internal state operations using parameters that are defined within the equipment phase object. Alternatively, one or more batch servers and/or other control components 630 coupled via a network connection 640 can access the equipment phase object 610 to affect operations within the controller 608. Such control components 630 can include controllers, computers, batch servers or processors, other modules, and so forth. Since the equipment phase object 610 provides internal and/or external control mechanisms, control system architectures can include hybrid type architectures that are combinations of the controller 608 and one or more of the other control components 630.

In one aspect of the present invention, various state machines or controls can exist on or in accordance with the batch server 630 which is illustrated at reference numeral 644, whereby a state machine can be provided for each step (or a subset of steps) within a recipe. For example, a state machine can be provided for each instance of an equipment module, the operation recipe step the module belongs to, the unit procedure recipe step the operation belongs to, the procedure (e.g., the recipe) the unit procedure step belongs to, and so forth which can all interact with the equipment phase object 610. Thus, multi-level state machines 644 can be provided that control/interact objects within the controller 608 and/or objects outside the controller. Thus, by not rigidly tying a single state machine in the controller 608 with a single state machine in the batch server 630, batch execution can be distributed over multiple controllers and/or other components in an efficient and scalable manner.

It is noted that an upper level component can "download" the logic to be used by lower level recipe elements. For example, if the "upper level" is a Unit Operation running inside of a batch server, it could download the "ING" or Active routines to be used by the equipment phase for this recipe execution. If the "upper level" were a batch procedure, it could download the recipe structure for the Unit Procedure and Unit Operations to be run inside of the Unit.

The equipment phase object 610 generally exists in the controller 608 and maintains pertinent information related to configuration, state, and execution of an associated process. From a high-level, the equipment phase object is generally responsible for such aspects as:
  Enforcing the state machine and providing services to command a Phase.
  Managing state routines and scanning a routine based on an active state.
  Providing services for sequencing engines to manage tags for parameter and report values.
  Exposing state data for internal (within the controller) and external clients.
  Providing configuration options and services for handling failures, holds, and restarts.
  Providing services to report and clear Phase failures.
  Providing services to request ownership of the Phase and enforcing rules of ownership.

The controller 608 can also include other aspects such as an interface 650 that enable users to easily configure and monitor the object 610 or other components within the controller. This can also include such aspects as providing one or more instructions to facilitate internal and/or external control operations. Additionally, one or more dynamic controls 660 can be provided to facilitate operations within the system 600. Such controls can include phase controls, routine controls, external/internal sequencing controls, and such aspects as handling of internal or external notifications and events, for example. Such interfaces 650 and controls 660 are described in more detail below.

Figure 7:
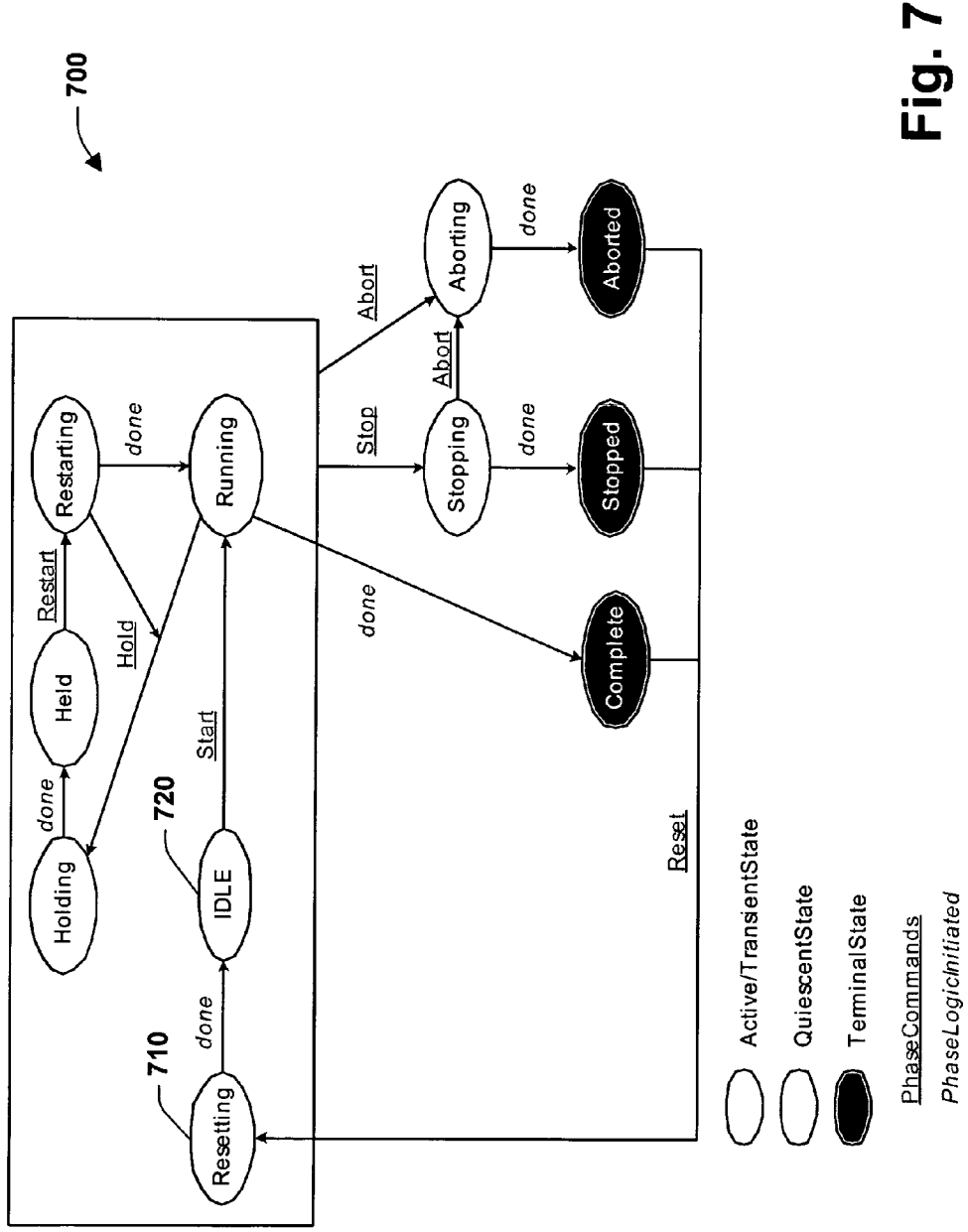
FIG. 7 is a state diagram illustrating an equipment phase state machine in accordance with an aspect of the present invention.

Referring now to FIG. 7, an equipment phase state machine 700 is illustrated in accordance with an aspect of the present invention. As noted above, the equipment model described above includes the execution of a state-driven sequencing engine internally in one or more families of controllers. The state machine 700 is typically a modified S88 state model with additions such as a Resetting state 710 to allow code to be written and executed before an IDLE state 720, for example. The state machine 700 cooperates with an equipment phase object that encapsulates associated control data and related behavior of the phase (e.g., state machine, data type, tag updates). It is noted that the state machine can be embedded within the object and/or exist as a complete or partial functional entity from the object. As illustrated in the state machine 700, various states are supported such as holding, held, restarting, running, stopping, aborting, complete, stopped, aborted, and so forth. Also, various phase commands are provided for transitioning between states such as start, restart, stop, and abort, for example.

The above model provides several advantages to a user such as:
  A user doesn't have to write and debug state machine code since it's encapsulated into an object.
  This also mitigates validation costs for user's—the state machine, it's ability to trigger the correct phase logic ("ING" routines or "Active States"), and it's updating of the phase data (the tag) generally are only validated once.

The equipment phase state machine 700 facilitates that phase logic exhibits the behavior characteristics to be controllable by a sequencing engine. This machine is typically an integral part of the equipment phase object, however, other implementations are possible. The equipment phase object generally determines state transitions, the validity of phase commands, and/or other aspects related to the state machine 700. The object is also responsible for managing concurrent access from multiple clients that may try to affect the state of the object. For example, if a phase command from an internal sequencing engine (in a user task) occurs at a similar time as the phase logic sets the state to done (in the phase task), the equipment phase object should predictably and reliably manage these concurrencies.

The Resetting state 710 can be added to the equipment phase's state machine 700 for at least the following reasons: Adding this state provides support for a PackML state machine (Package Machinery Language Team of the Open Modular Architecture Controller (OMAC) group). The S88 state machine is somewhat inconsistent in that phase logic code can be written to respond to most commands except for Reset. A user may require some phase logic to properly return the object to an Idle state. If the phase's Running state is implemented as an Sequential Function Chart (SFC), upon completion the SFC resides at the terminal step. In order to direct the SFC back to the initial step, either some logic resets the SFC (using an SFR instruction), the user codes the SFC with a "loopback" from the end back to the initial step, or the Equipment Phase itself has to "fix-up" the SFC. The last option is generally not desirable—the phase cannot generally account for all the potential permutations and combinations of the user's logic. The state machine 700 of an equipment phase can be configured utilizing the following attributes:

| Configuration Item | Description |
| --- | --- |
| Initial State | The state to which the system should initialize the Phase (e.g., on power-up or pre-scan). The following states are valid for this item:<br>    Idle [default]<br>    Stopped<br>    Aborted<br>    Complete |
| Active State Routine not Implemented | The action to take when the Phase transitions to a state where the State Routine is not implemented.<br>    Immediately (or as soon as possible) set State Complete [default]<br>    Set a Phase Failure<br>    Demo Mode - set State Complete after 10 seconds<br>    No Action |

Figure 8:
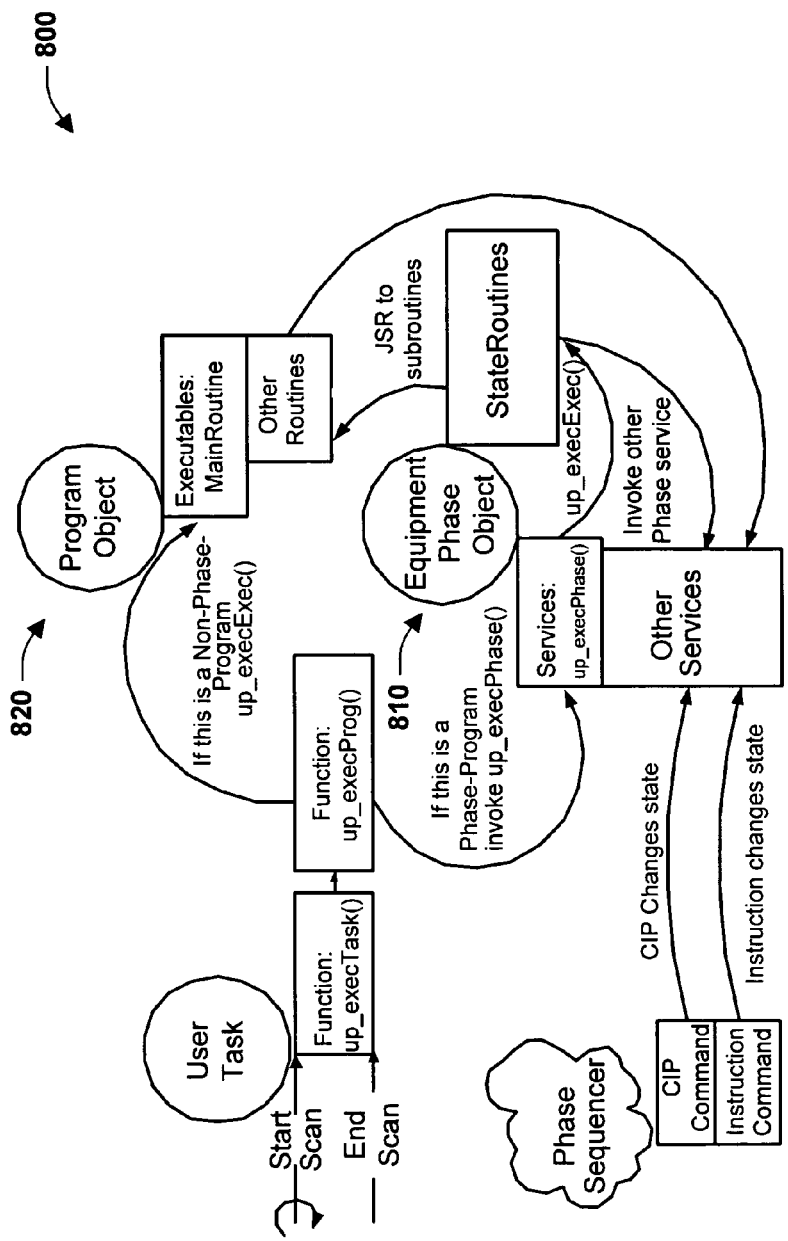
FIG. 8 is a state diagram illustrating an execution model in accordance with an aspect of the present invention.

FIG. 8 is a system 800 illustrating an execution model in accordance with an aspect of the present invention. Within the execution model 800, an Equipment Phase execution 810 follows a current Program execution model at 820. The Equipment Phase enforces the S88 state machine (or other standard than S88) and executes S88 state transition logic. The Program serves as the execution vehicle, and the Equipment Phase binds to a program in order to be executed. As long as the Equipment Phase is bound to a Program, then at runtime the program executes the Equipment Phase's execution logic. This implies that respective Phase instances have an entry point to serve as the binding interface to a Program (e.g., similar to a Windows environment, as the DLLMain of a DLL that is invoked at runtime by the main thread of an execution program). This entry point interface invokes the Equipment Phase's state transition logic routine based on the Equipment Phase's current state status.

Generally, an Equipment Phase is associated with a Program, in a firmware execution engine, whereby a Program is usually considered as a "Non-Phase-Program" if there is no Equipment Phase associated with it, or a "Phase-Program" if there is an Equipment Phase associated with it. For a Phase-Program, generally no Main Routine exists; the execution engine calls the associated Equipment Phase via the Equipment Phase's entry point service. In order to achieve this behavior, the following modifications to a controller's logic engine may be provided:
  A Task-Program execution model can be unmodified.
  A new function, up_execPhase( ), is created to execute the Equipment Phase. This is a private service of Equipment Phase that serves as the Equipment Phase's entry point interface. This service executes the Equipment Phase's state routines accordingly.
  The execution engine, that is the up_execProg( ) function, is modified to determine whether a Program is a Non-Phase-Program or a Phase-Program. If the Program is a Non-Phase-Program, then the engine executes the Program's Main Routine; if the Program is a Phase-Program, the engine executes the Equipment Phase by invoking up_execPhase( ).

Equipment Phase instances typically have an entry point interface that the execution engine calls at runtime to execute the phase. This service executes a Pre-state routine and the implemented state routines during pre-scan. For regular execution (after pre-scan), this service executes the Pre-state routine and the current active state routine. This service also updates the internal executing-state value at the beginning of each scan of the active state routine, in order that this value can be utilized by an instruction to complete the active state routine. The execution engine is generally updated to distinguish a Non-Phase-Program from a Phase-Program and execute it accordingly. The execution engine binds the Equipment Phase and the Program at runtime for execution if the Program has an Equipment Phase associated with. The changes to the function up_execProg( ) may appear as:

If (the program is a Non-Phase-Program) {
// Normal execution
Execute the Program's Main Routine: invoke up_execExec( )
} Else {
// Program is a Phase-Program new execution path
Execute the Equipment Phase: invoke up_execPhase( )
}

At runtime, the execution vehicle: Program, which is scheduled in a user task, is scanned to execute repeatedly. During a scan (or before/after), the execution engine invokes the Equipment Phase's entry point interface service: up_execPhase( ). This service executes the Prestate/state routines based on the current state of the Equipment Phase, and the internal execState variable is updated accordingly. Also, an Equipment Phase sequencer can issue commands (via CIP messages, Instructions, etc.) to attempt to change the state of the phase. The Equipment Phase object generally executes decisions on the state transition. On the next scan, a new state change is captured and the corresponding state routine is executed. The execution of an Equipment Phase is configurable using the following attributes:

| Configuration Item | Description |
| --- | --- |
| Prestate Routine | A routine to scan prior to executing any of the Phase's State Routines. This routine may perform and indicate some failure detection, verify that control modules are in the correct state, or execute other logic that is common to various state routines.<br>None<br>Select from the Phase program's subroutines |

From a controller, other programs and routines can be defined that use specialized instructions to command phases (from within the controller) in simple operations (recipes)—referred to as Internal Sequencing. The phases can also be commanded by an external application that establishes a connection to the controller (such as a Batch Server)—referred to as External Sequencing. In addition, an operator, via an HMI, or control engineer, can manually sequence an Equipment Phase.

The applications described above generally fall into two types—Sequencing applications and Manual applications. As the name suggests, Sequencing applications manipulate Equipment Phase objects as a part of sequence (typically a higher-level recipe that includes the phase). These applications are programs; they programmatically interact with the phase based on a given set of data such as a recipe, for example. Typically, the applications determine if a phase is available for use (e.g., a Batch Server arbitrates for the use of a phase) before sequencing begins. Manual applications provide human operators the ability to manually control an Equipment Phase. Operators use these applications to command a phase during commissioning and/or troubleshooting scenarios, typically when there is a problem with a sequencing application that is using the same phase. The operator typically desires to take control of the Equipment Phase during manual operations even if another application owns it. Moreover, when taking control, the Equipment Phase should no longer accept commands from the sequencing application—only the operator should control it. In effect, the operator is overriding the sequencer.

Due to the possibility of multiple sequencing applications, another item can be introduced to the Equipment Phase associated with attaching to the phase before utilizing it. In essence, the sequencing application queries the phase: "Is the phase being used now?" If the phase is available, it reserves itself for the sequencer. If not, it returns a busy error to the caller (which can happen if another sequencing engine is executing). When the sequencing application attaches to the phase, the Equipment Phase accepts commands from that sequencer. When the sequencing application is finished commanding the phase, it detaches from it, thus allowing other sequencers the opportunity to attach to the phase. In a similar manner, manual applications make a request to the Equipment Phase to override a sequencing application that is already attached to it. When it is overridden, the Equipment Phase notifies the sequencer that its ownership has changed. Now that the phase is overridden, the overriding application is able to command the phase. Again, similar to a sequencer, the manual application detaches from the Equipment Phase after it finishes commanding the phase.

Figure 9:
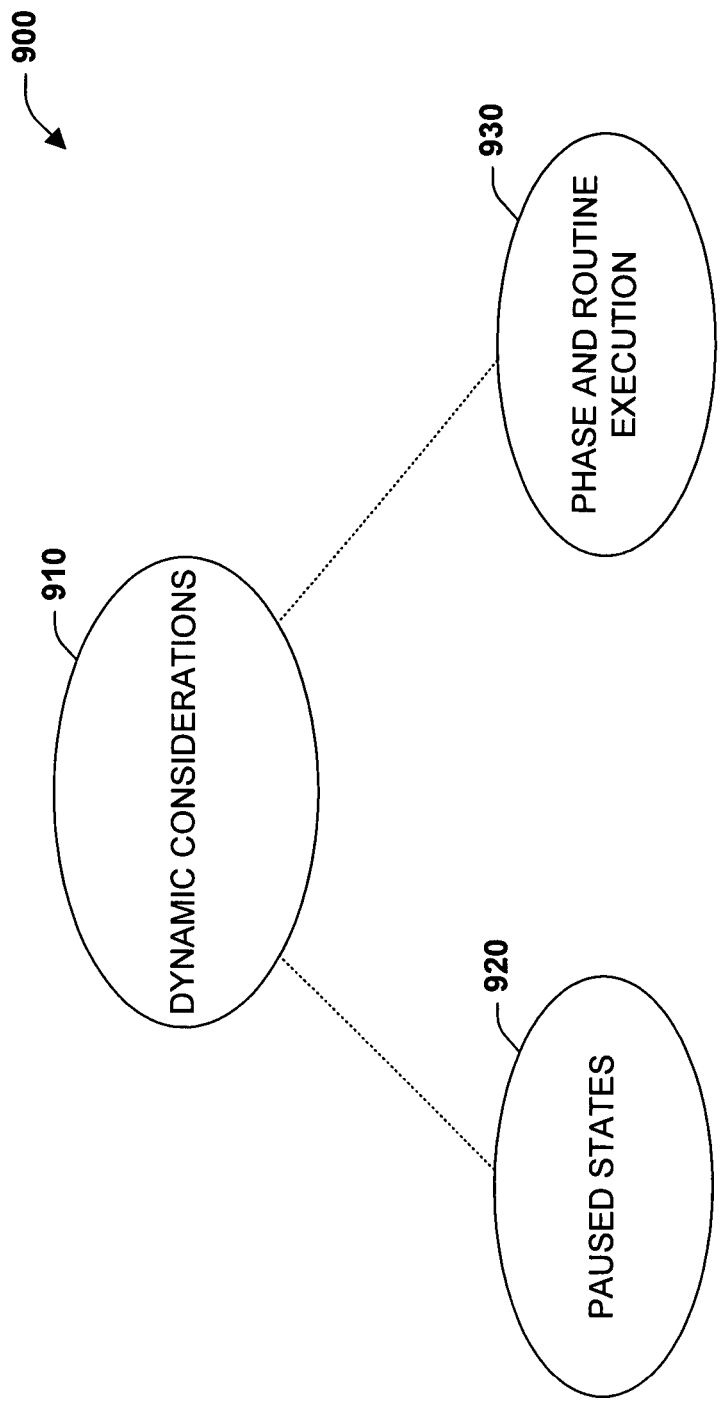
FIG. 9 illustrates dynamic processing considerations in accordance with an aspect of the present invention.

Referring now to FIG. 9, a diagram 900 illustrates dynamic processing considerations 910 in accordance with an aspect of the present invention. Additional "sub" states beyond those shown in FIG. 2 above can also be added. These states can be made available from any "Active" state (e.g., resetting, holding). At 920, phase logic developers employ an Equipment Phase Paused instruction (PPD) to set a breakpoint in one of the phase's state routines. Breakpoints can be utilized when an operator or sequencer sends a Pause command to the Equipment Phase. A Pause command changes the phase sub-state to Pausing, and then the phase logic programmer employs the PPD instruction to set a breakpoint, which changes the sub-state to Paused. The state routine should not be actively sequencing or stepping when it is paused. Then the operator or sequencer issues a Resume command to continue operation from the breakpoint. The following depicts an example logic representation of the PPD instruction.

| Feature | Description |
| --- | --- |
| Representation | -[PPD]- |

At 930, the Equipment Model provides the ability to execute separate and different state routines based on a phase state model described above. An equipment phase also has an associated program object that allows it to be scheduled similar to how a program is scheduled, and allows it to run state routines as well as normal subroutines.

Some of the advantages of these features and others are:
State routines can be easily implemented in any language supported by the controller.
Individual state routines allow for easy modularity of code. Conventionally, states are managed in one RLL routine (with fault detection—prestate—logic beforehand).
A configuration option is added to allow state routines to be unimplemented but act as if the state completes immediately. Conventionally, a user writes logic for each state, else the state will not complete.
A configuration option is added to allow the initial state to be configured.
Equipment phases can be scheduled to run in any desired task of any desired type.

Generally, only state routines defined in the state machine above (for "Active" states) can be defined and implemented, wherein names are fixed. This can reduce errors and debugging time as well as allow systems to be more familiar to users.

Figure 10:
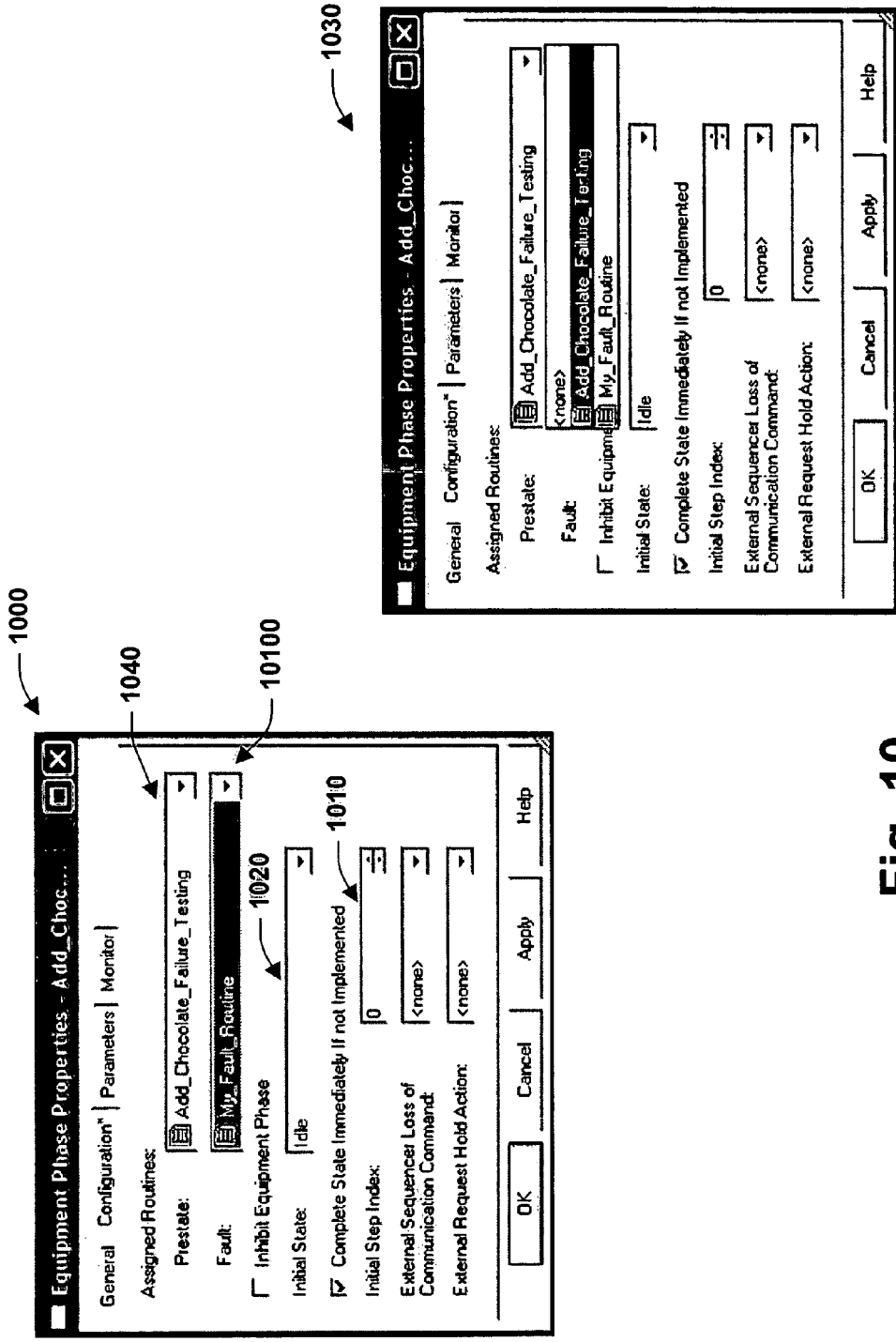
FIG. 10 illustrates exemplary user configuration interfaces in accordance with an aspect of the present invention.

Turning to FIG. 10, exemplary user configuration interfaces are illustrated in accordance with an aspect of the present invention. An interface 1000 illustrates example configuration options that can be selected and shows a configuration option on an equipment phase indicating to complete a state immediately if it is not implemented as well as an initial state at 1020 (e.g., Idle). An interface at 1030 illustrates the concept of selecting a "prestate" routine 1040 or fault routine 1050 in an equipment phase. The prestate routine is generally executed once during the controllers pre-scan, and is then executed with each phase state routine. The purpose of this extra routine is to allow the user to write code to check and indicate/signal for failure conditions (or ensure that equipment is in the correct position/state) before executing the state logic. Prior to the Equipment Model described above, a user typically wrote this logic at the beginning of each state routine and many times the code was identical. This allows it to be encapsulated in once place and automatically executed without additional work by the user.

It is noted that the graphical interfaces described herein are exemplary in nature and it is to be appreciated that various other implementations are possible. For instance, such interfaces can include a display output having one or more display objects that can include such aspects as configurable icons, buttons, sliders, input boxes, selection options, menus, tabs and so forth having multiple configurable dimensions, shapes, colors, text, data and sounds to facilitate operations with the interface. In addition, user inputs associated with the interface can also include a plurality of other inputs or controls for adjusting and configuring one or more aspects of the present invention. This can include receiving user commands from a mouse, keyboard, speech input, web site, browser, remote web service and/or other device such as a microphone, camera or video input to affect or modify operations of the user interfaces described herein.

Figure 11:
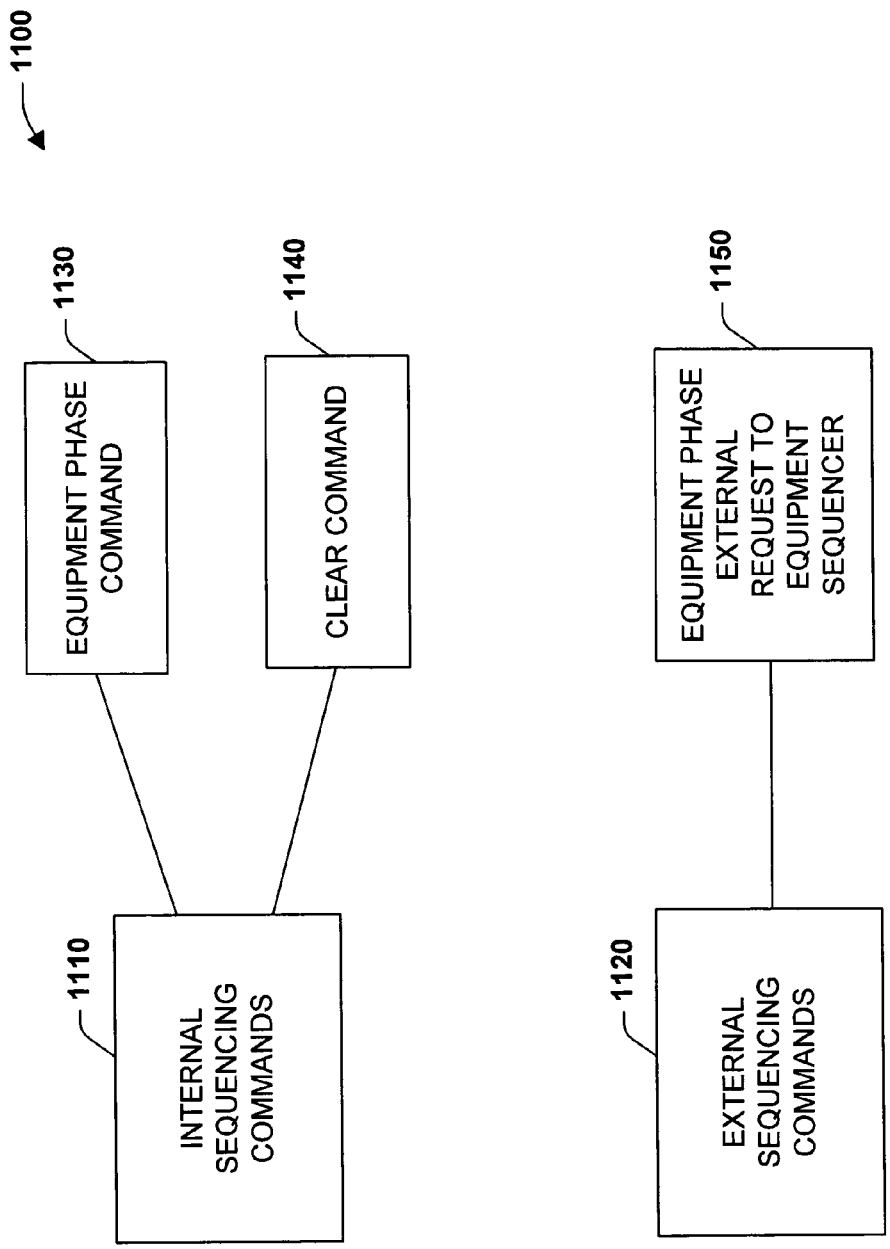
FIG. 11 is a diagram illustrating internal and external sequencing in accordance with an aspect of the present invention.

Referring now to FIG. 11, internal sequencing 1110 and external sequencing 1120 are illustrated in accordance with an aspect of the present invention. Internal sequencing 1110 allows a routine to take ownership of and command (sequence) an equipment phase. The ability to sequence a phase can be implemented by an instruction—PCMD, for example at 1130. In addition, an internal sequencer can clear a failure code in an equipment phase using a PCLF instruction, for example at 1140. Internal Sequencing has at least some of the following features and benefits:

Allows for simple recipes (batch or otherwise) to be executed directly in the controller. These recipes would typically be implemented in a Sequential Function Chart (SFC). Also, a phase can command a phase allowing for hierarchies of recipes.

Provides faster processing than sequencing with an external sequencer since there is no communication overhead.

Can co-exist with an external sequencer. Both can command phases in the same controller but are generally protected from both sequencing the same phase.

Provides for consistency of phase logic—can write phase logic and use it with either type of sequencer.

Provides redundancy that an external sequencer doesn't generally provide. For example, when an internal sequencer is operating on a primary controller, a redundant internal sequencer can be operating on a secondary, hot-backup or tertiary controller, thus using an internal sequencer supports controller redundancy in both the primary and back-up systems since the internal sequencer can be operated concurrently in such systems. The following describes some exemplary phase instructions:

| Instruction Name | Mnemonic | Description |
| --- | --- | --- |
| Equipment Phase Command | PCMD | Command an Equipment Phase to Start, Stop, Abort, Hold, Restart, Reset, Pause, and Resume. |
| Clear Equipment Phase Failure | PCLF | Clear the failure code in a failed Equipment Phase. |

Embedding an equipment phase in a controller as a native object allows external sequencers at 1120 to use Control and Information Protocol (CIP) messaging (or other network protocols) to communicate with the sequencer or object at 1150. Currently external sequencers (e.g., a Batch Server) use various tags via OLE for Process Control (OPC) to communicate to a controller although other techniques may be employed. The object mechanism of the present invention on the other hand provides a more reliable solution for communicating to a controller. In addition, the performance should be faster since handshaking and assurance of delivery is handled by Control and Information Protocol (CIP). Conventionally, integrity of data had to be ensured by multiple handshakes through tags, which required many more iterations. A PXRQ instruction, for example, allows phase logic to communicate to a Batch Server (or other external sequencer). The execution of this instruction uses a publish/subscribe/notify architecture described below. The following example provides a description of an external phase request instruction. It is to be appreciated that present invention is not limited to the example data structures shown.

| Feature | Description |
| --- | --- |
| Representation | PXRQ<br>Equipment Phase External Request<br>Request Control<br>Request ?<br>Data Values ?<br>—(EN)—<br>—(ER)—<br>—(IP)—<br>—(PC)— |

-continued

| Feature | Description |
|---|---|
| Request Control | Represents the control structure for the instruction. This operand expects a tag of type PHASE INSTRUCTION. |
| Request | Represents the external request. This operand expects a name of the external request. When edited, an alphabetically sorted combo box is displayed providing the available requests. The Requests are: Download Input Parameters Download Input Parameters - Subset Upload Output Parameters Upload Output Parameters - Subset Download Output Parameter Limits Acquire Resources Release Resources Send Message to Linked Phase Send Message to Linked Phase and Wait Receive Message from Linked Phase Cancel Messages to Linked Phase Send Message to Operator Clear Message to Operator Generate Electronic Signature Download Batch Data Download Material Track Data Container in Use Download Container Binding Priority Download Sufficient Material Download Material Track Database Data Upload Material Track Data Container in Use Upload Container Binding Priority |
| Data Values | Represents the parameters and data values associated with the request. This operand expects a tag integer array. The external sequencer defines the semantics of the data values for each request. |

PHASE_INSTRUCTION Control Structure Definition

| PXRQ Error and Extended Error Values | | |
|---|---|---|
| Field | Type | Description |
| .STATUS | DINT | The .STATUS member provides access to the status members (bits) in one, 32-bit word.<br>Bit  Field<br>23   .AIP<br>24   .ABORT<br>25   .WA<br>26   .IP<br>27   .PC<br>28   .ER<br>31   .EN<br>Resetting any of the status bits while the instruction is enabled can cause unpredictable results. |
| .EN | BOOL | The enable bit is set when the rung-condition-in goes true and remains set until either the .PC bit or the .ER bit is set and the rung-condition-in is false. If the rung-condition-in goes false, but the .PC bit and the .ER bit are cleared, the .EN bit remains set |
| .ER | BOOL | The error bit is set when the controller detects that the request has failed. The .ER hit is reset the next time the rung-condition-in goes from false to true. |

-continued

| PXRQ Error and Extended Error Values | | |
|---|---|---|
| .IP | BOOL | The in-process bit is set when external sequencer has received the request and is processing it. The .IP bit is reset the next time the rung-condition-in goes from false to true. |
| .PC | BOOL | The process complete bit is set when the external sequencer has completed its processing of the request. Note that the nature of the processing depends upon the external sequencer and the type of request. The .PC bit is reset the next time the rung-condition-in goes from false to true. |
| .ABORT | BOOL | If one manually sets the .ABORT bit, the Equipment Phase aborts the request and sets the .ER bit. The .ERR value indicates whether or not the abort was successful. |
| ERR | INT | If the .ER bit is set, the error code word identifies error codes for the instruction. |
| EXERR | INT | If the .ER bit and ERR word are set, the extended error code word specifies additional error code information for some error codes. |
| .WA | BOOL | The wait acknowledgement bit is set when the request is sent to the external sequencer but not yet acknowledged. This bit is cleared and the .IP bit is set when the external sequencer acknowledges receipt of the request. This bit is also cleared if the message could not be sent due to a connection timeout |

PXRQ Error and Extended Error Values

| | | | |
|---|---|---|---|
| .AIP | BOOL | | or network error, or if the request was aborted. The "abort in process" bit is set when the external sequencer has received the aborting request and is processing it. |

| .ER | ERR | EXERR | Semantic Meaning |
|---|---|---|---|
| 1 | 0 | 0 | Request processing aborted internally. |
| | 1 | 0 | Request processing aborted by external sequencer. |
| | 2 | 0 | Same type of request is pending, only one same type of request is allowed |
| | 3 | | Communication error, request not delivered |
| | | 0x0110 | There is no subscriber subscribed to the phase |
| | | 0x0210 | There is no connection connect to the Notify object |
| | | 0x0410 | Delivery failed |
| | | 0x1010 | External Sequencer does not subscribe to receive the external request |
| | 4 | | Request process completed but failed |
| | | 2 | Error processing phase logic request |
| | | 3 | Invalid Request value passed |
| | | 4 | Request State Machine not in valid mode for request processing |
| | | 5 | Request Failed due to unsupported overlapping of Requests |
| | 6 | | Error storing to parameter tags at end of request processing |
| | 5 | 0 | External sequencer received the request, but pass back invalid cookie |
| | 6 | 0 | PXRQ send invalid parameter to external sequencer |

Figure 12:
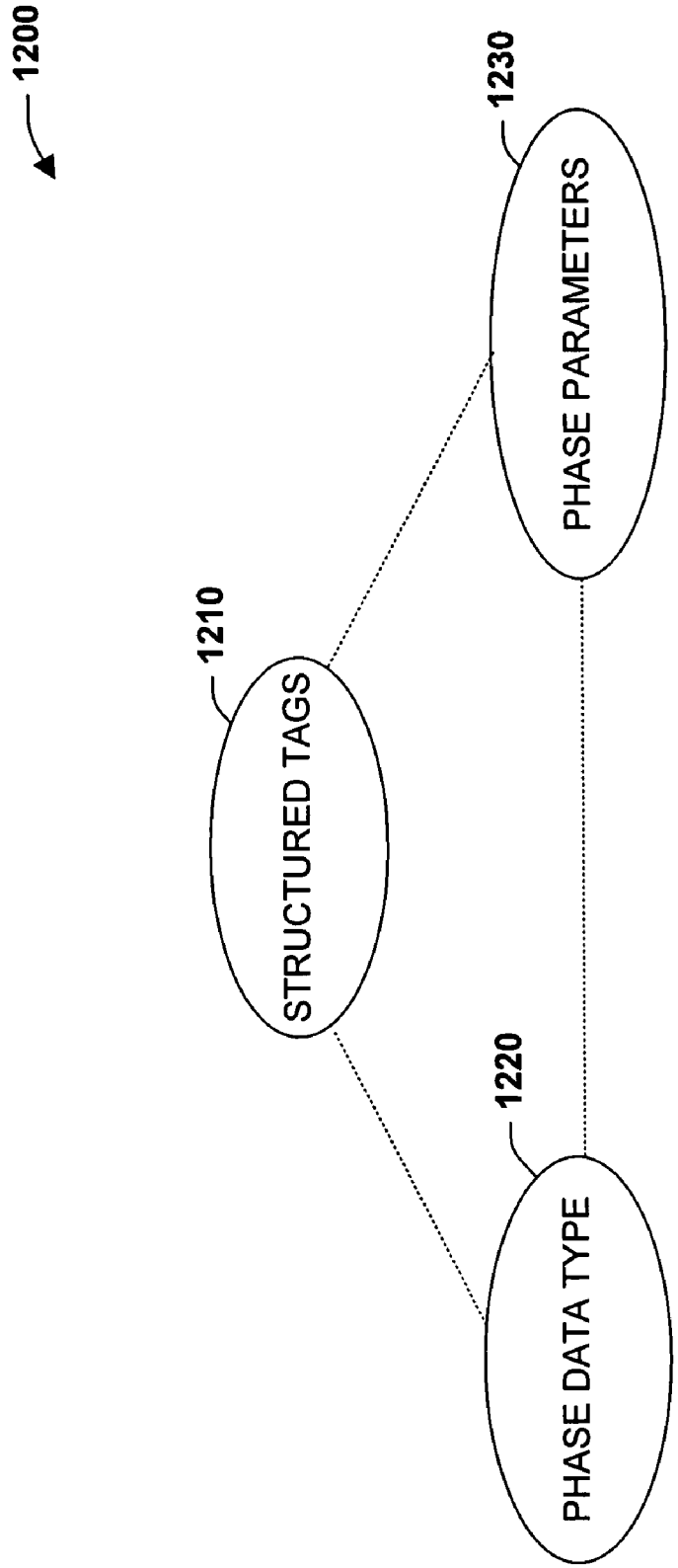
FIG. 12 is a diagram illustrating various data types in accordance with an aspect of the present invention.

Turning now to FIG. 12, various data types 1200 are illustrated in accordance with an aspect of the present invention. The respective types can include structured tags 1210, phase data types 1220, and/or one or more phase parameters which are described in more detail with respect to FIG. 13. Each equipment phase, when created, typically has a tag 1210 created based on a pre-defined (system defined) data type. This tag can be employed to monitor the state of the phase. The benefits of this is that it provides a consistent interface for the user to access phase data, and is consistent with how all other data in the controller is represented and accessed. At 1220, a PHASE data type is a predefined data type within a controller. The user can manually create a tag based on the PHASE data type however that tag cannot generally be assigned to a new or existing Equipment Phase. An example PHASE data type can be defined as follows:

| Element | Type | Default Radix | Notes/Description | Tag Access & Update Methods |
|---|---|---|---|---|
| State | DINT | Decimal | Indicates the current State of the Equipment Phase as defined by the S88 State Model. This element is the rollup of all phase state bits as defined below. One state bit is set at a time. | Updated by Equipment Phase object due to: PCMD (Phase Command) Instruction execution. PSC (State Complete) Instruction execution. Request from commanding application(s) to change the state of the phase. |
| Running | BOOL | | Equipment Phase is Running. It has received a Start command and the Running logic is being scanned. Bit 0 | |
| Holding | BOOL | | Equipment Phase is Holding. It has received a Hold command and the Holding logic is being scanned. Bit 1 | |
| Restarting | BOOL | | Equipment Phase is Restarting. It has received a Restart command and the Restarting logic is being scanned. Bit 2 | |
| Stopping | BOOL | | Equipment Phase is Stopping. It has received a Stop command and the Stopping logic is being scanned. Bit 3 | |
| Aborting | BOOL | | Equipment Phase is Aborting. It has received an Abort command and the aborting logic is being scanned. Bit 4 | |
| Resetting | BOOL | | Equipment Phase is Resetting. It has received a Reset command and the Resetting logic is being scanned. Bit 5 | |
| Idle | BOOL | | Equipment Phase is Idle. It has completed executing its Resetting logic (if any). Bit 6 | |
| Held | BOOL | | Equipment Phase is Held. It has completed executing its Holding logic (if any) Bit 7 | |
| Complete | BOOL | | Equipment Phase is Complete. It has completed executing its Running logic (if | |

| Element | Type | Default Radix | Notes/Description | Tag Access & Update Methods |
|---|---|---|---|---|
| | | | any). Bit 8 | |
| Stopped | BOOL | | Equipment Phase is Stopped. It has completed executing its Stopping logic (if any). Bit 9 | |
| Aborted | BOOL | | Equipment Phase is Aborted. It has completed executing it's Aborting logic (if any). Bit 10 | |
| Substate | DINT | Decimal | Indicates the current Substate of the equipment phase. The Substate is typically used by Batch applications that have programmed breakpoints in their logic. This element is the rollup of all SubState bits as defined below. If the SubState is zero, the phase is not in any of the substates. Online Help: Reference a topic that describes the S88 State Model. | Updated by Equipment Phase object due to: PCMD (Phase Command) Instruction execution. PPD (Equipment Phase Paused) instruction execution. Causes Substate to change to Paused. Request from commanding application (s) Resume Command causes SubState to change to Normal Pause Command causes SubState to change to Pausing SemiAuto Command causes SubState to change to SemiAuto |
| Pausing | BOOL | | Equipment Phase is Pausing. It has received a Pause command and will stop at the next programmed breakpoint. Bit 0 | |
| Paused | BOOL | | Equipment Phase is Paused. It has stopped at a programmed breakpoint. The Resume command must be received before the phase will transition to the Running State. Bit 1 | |
| AutoPause | BOOL | | The Equipment Phase is configured so that it does not require a Pause command to stop at the next programmed breakpoint. AutoPause can be thought of as triggering a "Pause" command automatically. AutoPause generally requires a Resume command to transition the phase to the Running state. | |
| StepIndex | DINT | Decimal | A user defined value typically used only by Batch applications to indicate the location (or progress made) in phase logic. The value of the Step Index is application dependent. | Updated by user directly in Tag Editor Updated by logic via general data manipulation instruction (example: MOV) |
| Failure | DINT | Decimal | A user defined value typically used only by Batch applications to save a failure (error) value. Higher values indicate the severity of the failure. To set this value, users use the PFL instruction. It is this instruction that enforces only higher values are written. The value of the Failure is application dependent. | Updated by Equipment Phase object due to: PFL (Equipment Phase Failure) instruction execution. PCLF (Clear Equipment Phase Failure) instruction execution. Request from commanding application(s) to clear the failure value. |
| UnitID | DINT | Decimal | A user defined value typically used only by Batch applications to indicate an ID of the Unit that owns the phase. | Updated by Equipment Phase object due to: Request from commanding application(s) to set the Unit ID. |
| Owner | DINT | Hex | Indicates the current classes of owner of the equipment phase - the type of applications that are currently allowed to | Updated by Equipment Phase object due to: |

| Element | Type | Default Radix | Notes/Description | Tag Access & Update Methods |
|---|---|---|---|---|
| | | | or waiting to command the phase. Low bits indicate the application type that is currently commanding the phase. | PATT (Phase Attach) instruction execution. PDET (Phase Detach) instruction execution. Request from commanding application(s) - Attach( ) Request from commanding application(s) - Override( ) |

Low 16 bits indicate the current state of the equipment phase ownership:
0000 0000 0000 0001 = 0x0001 = Bit 0 = External Sequencer
0000 0000 0001 0000 = 0x0010 = Bit 4 = Internal Sequencer
0000 0001 0000 0000 = 0x0100 = Bit 8 = HMI
0001 0000 0000 0000 = 0x1000 = Bit 12 = RSLogix 5000
Combinations of these bits indicate which applications currently own the phase, for example:
0x1001 = an External Sequencer and programming software both own the phase.
0x1111 = one of each type of application own the phase.
High 16 bits indicate the number of applications currently attached of each type
0000 0000 0000 0001 = 0x0001 = indicates number of External Sequencers, can only ever be one
0000 0000 0001 0000 = 0x0010 = indicates number of Internal Sequencers, can only ever be one
0000 xxxx 0000 0000 = 0x0x00 = indicates number of HMI Applications, from 0 thru 15 If more than 15 applications of this type own the phase that will not be indicated.
xxxx 0000 0000 0000 = 0xx000 = indicates number of programming software Applications, from 0 thru 15. If more than 15 applications of this type own the phase that will not be indicated.
Full Examples:
0000 0010 0000 0000 0000 0001 0000 0000 = 0x0200 0100 = 2 HMI's own the phase
0000 0100 0000 0001 0000 0001 0000 0001 = 0x0401 0101 = 4 HMI's own the phase and they have overridden an External Sequencer
1000 0000 0001 0000 0001 0000 0001 0000 = 0x8010 1010 = 8 programming software workstations have overridden an Internal Sequencer

| Element | Type | Default Radix | Notes/Description | Tag Access & Update Methods |
|---|---|---|---|---|
| PendingRequest | DINT | Decimal | Rollup of all PendingRequest bits defined below. Typically only used for communication with an external sequencer like the Batch Server. | Updated by Equipment Phase object due to: PXRQ instruction execution PXDT instruction execution Request completion indication from commanding application(s) |
| DownloadInputParameters | BOOL | | Input parameters are being transferred to the Equipment Phase. Bit 0 | |
| DownloadInputParametersSubset | BOOL | | A subset of input parameters are being transferred to the Equiment Phase. Bit 1 | |
| UploadOutputParameters | BOOL | | The Equipment Phase is transferring output parameters to an external sequencer. Bit 2 | |
| UploadOutputParametersSubset | BOOL | | The Equipment Phase is transferring a subset of output parameters to an external sequencer. Bit 3 | |
| DownloadOutputParameterLimits | BOOL | | Input parameter limits are being transferred to the Equipment Phase. Bit 4 | |
| AcquireResources | BOOL | | The Equipment Phase is requesting the Batch Server to acquire a pre-configured resource. Bit 5 | |
| ReleaseResources | BOOL | | The Equipment Phase is requesting the Batch Server to release a pre-configured resource. Bit 6 | |
| SendMessageToLinkedPhase | BOOL | | The Equipment Phase is sending a message to another phase via the Batch Server. The phases are "linked". The Equipment Phase is not waiting for the message to reach its destination. Bit 7 | |
| SendMessageToLinkedPhaseAndWait | BOOL | | The Equipment Phase is sending a message to another phase via the Batch Server. It is waiting for the message to reach its destination The phases are "linked". Bit 8 | |

| Element | Type | Default Radix | Notes/Description | Tag Access & Update Methods |
|---|---|---|---|---|
| ReceiveMessageFromLinkedPhase | BOOL | | The Equipment Phase is receiving a message from another phase. The phases are "linked". Bit 9 | |
| CancelMessageToLinkedPhase | BOOL | | The Equipment Phase is canceling a message it sent to another phase via the Batch Server. The phases are "linked". Bit 10 | |
| SendMessageToOperator | BOOL | | The Equipment Phase is sending a message to the Batch Server that is to be displayed on the Batch View for the operator. Bit 11 | |
| ClearMessageToOperator | BOOL | | The Equipment Phase is clearing a message previously sent to the Batch Server for display on the Batch View. Bit 12 | |
| GenerateESignature | BOOL | | Bit 5 | |
| DownloadBatchData | BOOL | | Bit 14 | |
| DownloadMaterialTrackDataContainerInUse | BOOL | | Bit 15 | |
| DownloadContainerBindingPriority | BOOL | | Bit 16 | |
| DownloadSufficientMaterial | BOOL | | Bit 17 | |
| DownloadMaterialTrackDatabaseData | BOOL | | Bit 18 | |
| UploadMaterialTrackDataContainerInUse | BOOL | | Bit 19 | |
| UploadContainderBindingPriority | BOOL | | Bit 20 | |
| UploadMaterialTrackDatabaseData | BOOL | | Bit 21 | |
| AbortingRequest | BOOL | | The Equipment Phase is aborting the current request. Bit 22 | |
| NewInputParameters | BOOL | | Indicates to the equipment phase that a new parameter or parameters may be available to it. The Phase should monitor this value and, when it is set, call the PRNP instruction to clear this bit. | Updated by Equipment Phase object due to: Request from commanding application(s) to indicate that new parameters are available. PNP (Equipment Phase New Parameters) instruction execution clears this. |

Figure 13:
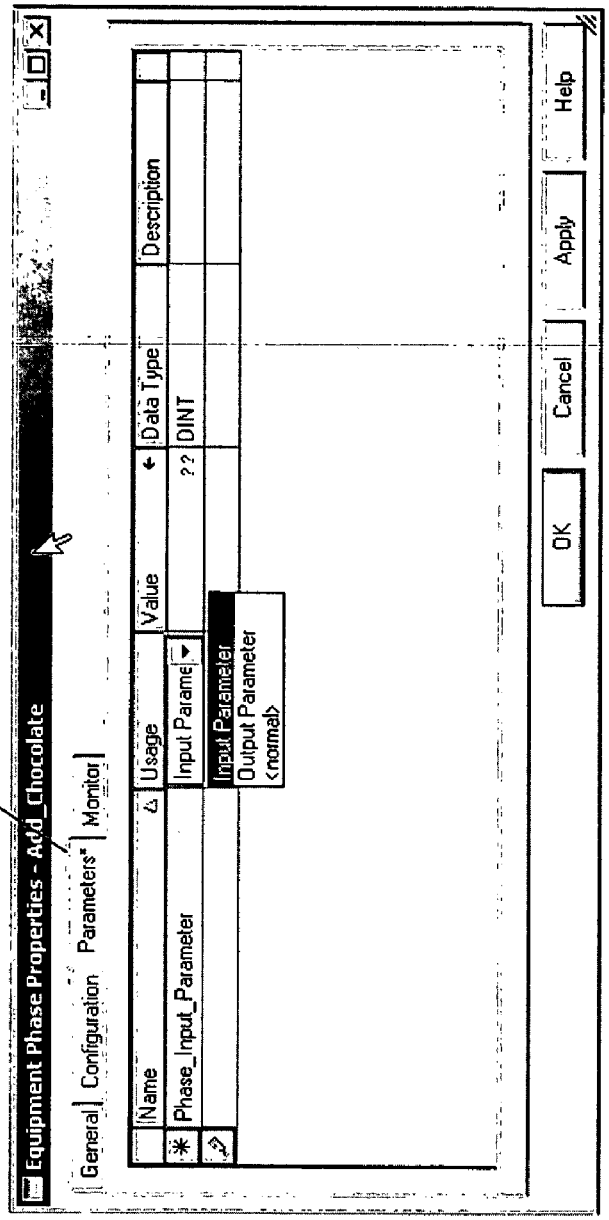
FIG. 13 illustrates an example interface for entering phase parameters in accordance with an aspect of the present invention.

FIG. 13 illustrates an example interface 1300 for entering phase parameters in accordance with an aspect of the present invention. Phases can have Input and Output parameters to provide a mechanism to transfer information to and from an equipment phase. Parameters are scoped to a phase to allow encapsulation of a phase's data and provide for easier reuse. Parameters are generally created as "normal" tags, and then assigned to be a parameter on a phase. One method is shown on the interface 1300 on a parameters tab 1310 associated with the phase properties.

Figure 14:
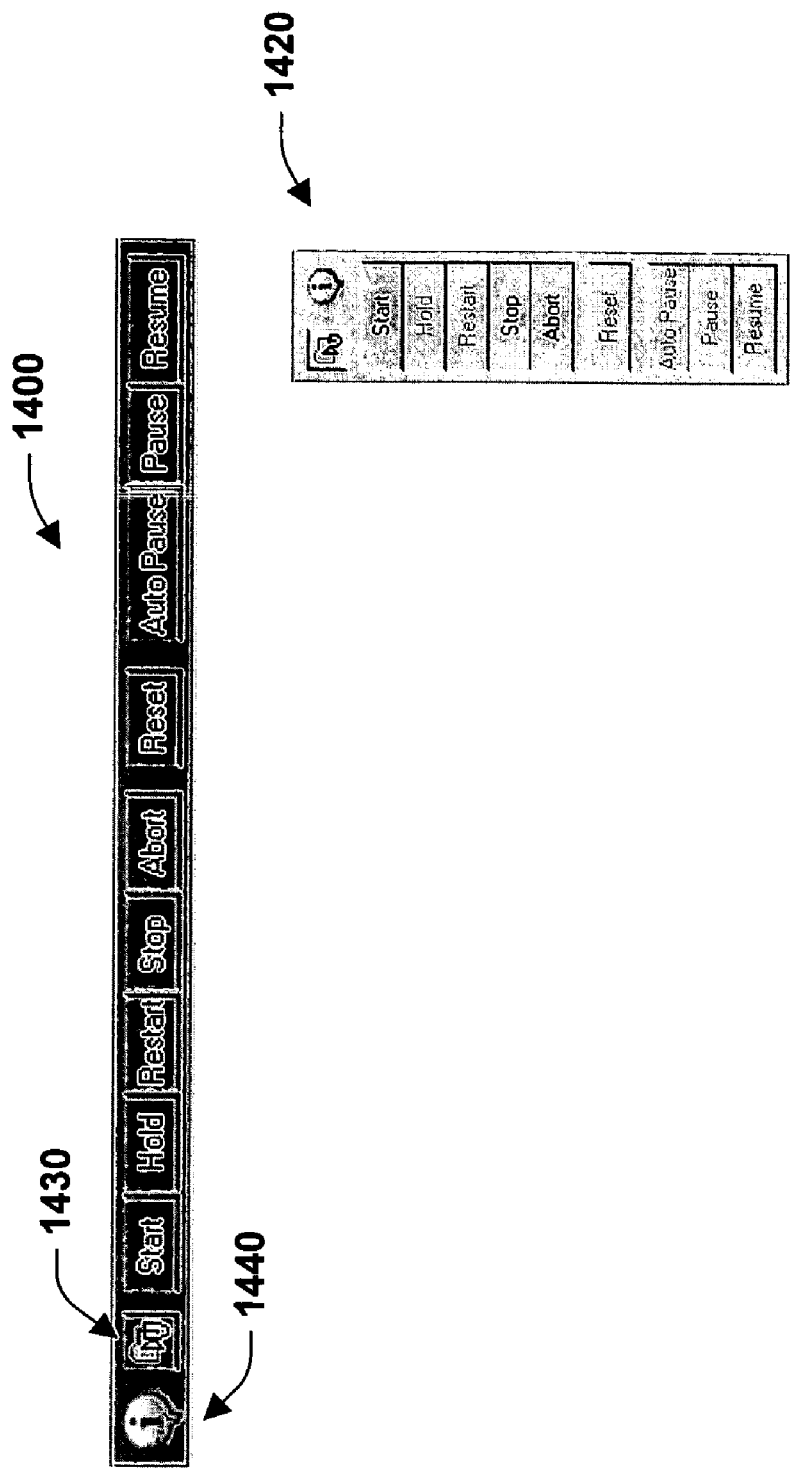
FIG. 14 illustrates a phase toolbar in accordance with an aspect of the present invention.

FIG. 14 illustrates a phase toolbar 1400 in accordance with an aspect of the present invention. An alternative arrangement can be provided as depicted at 1420 (e.g., dragging and docking toolbar of 1400). The toolbar 1400 provides the following functions and features:

Allows a user to monitor the current state, owner, and fault information for a phase, via a dynamically updating tooltip that has no timeout value (does not disappear after a timeout, disappears when the mouse is moved, for example).

Allows a user to take ownership of a phase which can be confirmed (e.g., by a dialog window) to promote safety.

Allows a user to command a phase (sequence it)—command the phase without writing code to force particular state logic to be executed. This commanding is achieved in the context of the currently executing logic and not independent of it as would be done via an external HMI, for example. This is beneficial during a troubleshooting and commissioning stage of a project, for example.

An external or internal sequencer can send a state transition command to the Equipment Phase. The phase determines if the command is valid for its current state, and if it is, transitions to the appropriate/next state based on its state machine. Controller programming software provides manual commanding of an Equipment Phase. When online with an opened routine that belongs to an Equipment Phase, an Equipment Phase Command toolbar 1400 can be displayed. Using this toolbar, users can command the Equipment Phase owning the online routine. To command an Equipment Phase, users first take ownership of the Equipment Phase. This is achieved by depressing a button at 1430. Until then, other buttons are disabled. The following provides an exemplary functional description of various buttons appearing on the toolbar 1400:

| Feature | Description | |
|---|---|---|
| See reference numeral 1440 of FIG. 14. | Information hotspot. When hovering the mouse over this icon, a tooltip is displayed showing the following information about the Equipment Phase.<br>Name of the Equipment Phase<br>Owner of the Equipment Phase. This information comes from the Phase Tag. Thus, this will show a value even when offline.<br>Current state of the Equipment Phase. This information comes from a Phase Tag. Thus, this will show a value even when offline.<br>Current Substate of the Equipment Phase. This field is not displayed if there is no substate (if the tag element is zero). This information comes from the Phase Tag. Thus, this will show a value even when offline.<br>Failure code. This entire field is not displayed the failure code is zero (the tag element is zero). This information comes from the Phase Tag. Thus, this will show a value even when offline.<br>This tooltip stays open as long as the mouse is over this hotspot. While open, the information within the tooltip is kept up todate. | Equipment Phase: TransferOut<br>Owner: RSLogix 5000<br>State: Running<br>Substate: Paused<br>Failure: <some number> |
| See reference numeral 1430 of FIG. 14. | Ownership Phase Icon. This toolbar button acts like a toggle button. When the instance of controller programming software has ownership of the Equipment Phase, this button remains down.<br>The command buttons are disabled as long as this instance of controller programming software does not own the Equipment Phase (this button is up).<br>Along with the information about what this button is, the tooltip for this button also displays the Equipment Phase's owner, state and substate. | Take ownership of 'TransferOut'<br>Current Owner: External Sequencer<br>State: Running<br>Substate: Paused |
| Start | Requests the Equipment Phase to go into the Start state.<br>Enabled when controller programming software is online, has ownership and the Equipment Phase is in the Idle state, and the Equipment Phase is not inhibited. | |
| Hold | Requests the Equipment Phase to go into the Hold state.<br>Enabled when controller programming software is online, has ownership, the Equipment Phase is in the Running, or Restarting state, and the Equipment Phase is not inhibited. | |
| Restart | Requests the Equipment Phase to go into the Restart state.<br>Enabled when controller programming software is online, has ownership, the Equipment Phase is in the Held state, and the Equipment Phase is not inhibited | |
| Stop | Requests the Equipment Phase to go into the Stop state.<br>Enabled when controller programming software is online, has ownership, the Equipment Phase is in the Running, Holding, Restarting, Resetting, Idle, or Held state, and the Equipment Phase is not inhibited | |
| Abort | Requests the Equipment Phase to go into the Abort state.<br>Enabled when controller programming software is online, has ownership, the Equipment Phase is in the Running, Holding, Restarting, stopping, Resetting, Idle, or Held state, and the Equipment Phase is not inhibited | |
| Reset | Requests the Equipment Phase to go into the Reset state.<br>Enabled when controller programming software is online, has ownership, the Equipment Phase is in the Complete, Stopped, or Aborted state, and the Equipment Phase is not inhibited | |
| Auto Pause | Requests the Equipment Phase to turn on Auto Pausing. Auto pausing is a substate that causes the phase to automatically pause at the next programmed breakpoint. It mitigates the need to continually issue the Pause command.<br>This toolbar button acts like a toggle button. Meaning, when Auto Pausing is on, the button is latched (it remains depressed). When Auto Pausing is off, the button isn't depressed.<br>Disabled when the Equipment Phase in inhibited. | |
| Pause | Request to Equipment Phase to pause at the next programmed breakpoint. After this, the Resume command is sent before the Equipment Phase will transition back to the running state.<br>This button is enabled when the Equipment Phase is in the Running state.<br>User programmed breakpoints are set using the PPD instruction.<br>Enabled when controller programming software is online, has ownership and the Phase is not inhibited. | |
| Resume | Requests the Equipment Phase to resume running from the Paused substate.<br>The Equipment Phase should be in the Paused substate in order for this button to be enabled. This is disabled if the Equipment Phase is inhibited. | |

It is noted that Equipment Phases in the Equipment Model should be "owned" before they can be commanded (sequenced). In past Batch implementations, ownership was a single bit value for either a Batch Server or an HMI. Since this value is a tag, there are no mechanisms to enforce rules regarding the ownership or commanding. With the Equipment Model, the ownership rules are intrinsic to the Equipment Phase object and it can enforce these rules. The equipment phase enforces priorities as shown in the table below.

| Application | Priority |
| --- | --- |
| Controller Programming Software | 2 (Highest) |
| HMI | 1 |
| External or Internal Sequencer | 0 (Lowest) |

The controller programming software has the highest priority and can "Override" an application that is currently commanding the phase. This is to support operator troubleshooting needs. In contrast, sequencers are lowest priority and cannot override HMI's or controller programming software. The equipment phase enforces these priorities, and tracks which application has been overridden, so that when a higher priority application has detached, the lower priority application can begin to command the phase again. A controller programming software user takes ownership of a phase by using the Phase commanding toolbar 1400, whereas an HMI generally takes ownership of a phase via CIP messaging (or other type). An external sequencer takes ownership via CIP or other type messaging as well. Internal Sequencers employ PATT and PDET to attach (own) and detach (stop owning) instructions as shown below:

| Instruction Name | Mnemonic | Description |
| --- | --- | --- |
| Attach to an Equipment Phase | PATT | Request to Attach to an Equipment Phase for the purposes of calling the PCMD or PCLF instructions.<br>If a Server is commanding an Equipment Phase, then internal sequencers call this instruction before the PCMD or PCLF instruction can be called. If there is no Server, then using this and the PDET instruction is an optional protocol for users. |
| Detach from an Equipment Phase | PDET | Detach from an Equipment Phase after calling the PCMD or PCLF instructions.<br>If a Server is commanding an Equipment Phase, then internal sequencers call this instruction after the PCMD/PCLF instruction is called. If there is no Server, then using this and the PATT instruction is an optional protocol for users. |

Figure 15:
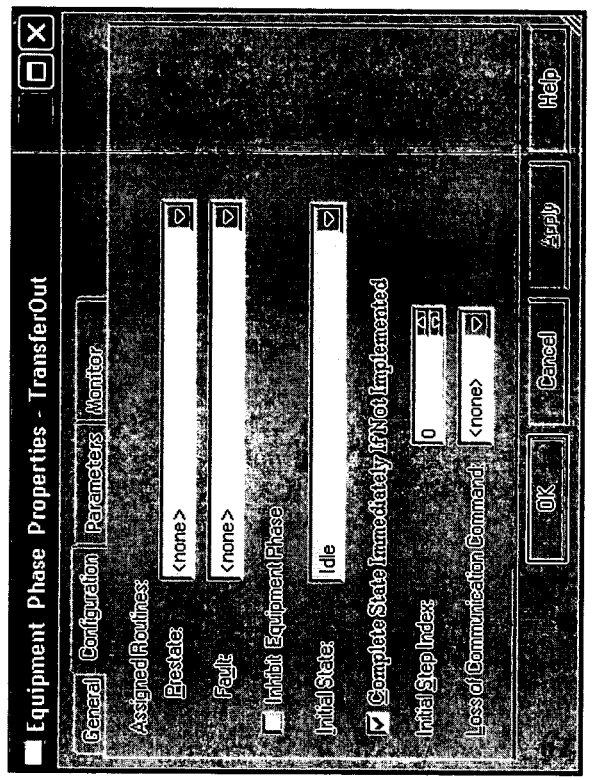
FIG. 15 illustrates an example interface supporting a hybrid control system in accordance with an aspect of the present invention.

FIG. 15 illustrates an example interface 1500 supporting a hybrid control system in accordance with an aspect of the present invention. Embedding Equipment phase objects into a controller with the behaviors, configuration options, and data as described above, facilitates integrating Batch or other type control servers into an integrated architecture that already contains sequential, motion, and continuous process control, for example. Elements of the areas described above can have some Batch specific elements to allow for tighter integration of Batch products with controller products. This list includes:

Configuration options for use with the Batch Server: Initial State, Initial Step Index, External Sequencer Loss of Communication Command, and External Request Hold Action as shown in the interface 1500.

Input and Output parameter tags.

PXRQ instruction to communicate with an External Sequencer such as a Batch Server, for example.

Phase failure in the phase tag, PFL instruction to set it, PCLF instruction to clear.

Phase tag data specific to Batch such as: Step Index, Failure, Pending Request, and New Input Parameters.

Batch specific instruction to reset new parameters—PRNP.

In addition, the ability to employ internal sequencing allows sequencing of simple batch recipes directly into the controller.

Figure 16:
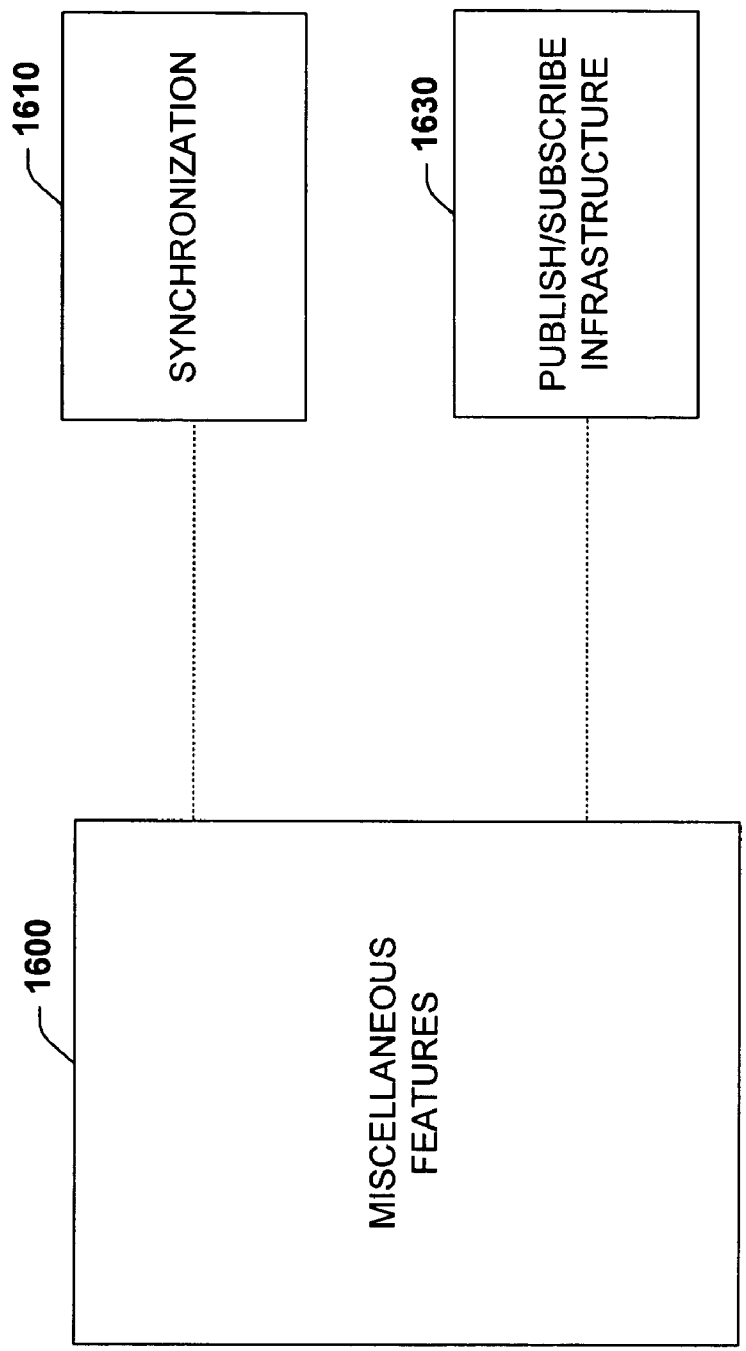
FIG. 16 illustrates miscellaneous aspects in accordance with the present invention.

FIG. 16 illustrates miscellaneous aspects 1600 in accordance with the present invention. Proceeding to 1610, synchronization aspects are provided. The Equipment Model provides a mechanism referred to as synchronization to help Batch users workflow as they move between the Batch tools and controller programming software tools. The basic concepts are that the user does not have to type the same thing twice and that the applications facilitate so that the user does not make mistakes. In a conventional Batch Equipment Editor, for example, the user must enter all of their Equipment Phase names as well as the input and output parameter names for each phase. They must then manually replicate this same information in the controller programming software. With synchronization of the present invention, they enter the data once—either in the Equipment Editor or controller programming software—and then press a synchronization button at which point the system updates the data across system and tool boundaries.

From the system design perspective, each tool—the Equipment Editor and controller programming software—generally continues to manage its own data store. The Equipment Editor controls an Area Model, whether it is in a binary file, an XML file, or an electronic directory, for example. The controller programming software controls its project file and data maintained within it. The tools communicate via programmatic interfaces, and thus, the internal design and architecture of each application is minimally impacted by the synchronization functions.

At 1630, an event and subscription architecture can be provided. The ability for a phase to communicate with an external sequencer can built upon Publish/Subscribe/Notify infrastructure. This infrastructure can be designed and layered as such so as to be common and be used by the Equipment Model feature and Alarms & Events features, and/or and other features that may need such communication schema. In one aspect a general dynamic publisher/subscriber mechanism is provided which can be used for a variety of applications such as a part of an overall event and alarm infrastructure that is applicable on CIP or other network devices. For example, a CIP event and alarm infrastructure, one of the first applications of a dynamic publisher/subscriber mechanism can be described as a three-layer architecture having:

CIP Layer—corresponds to specification of Control and Information Protocol.

CIP Dynamic Publisher/Subscriber Layer—defines general dynamic publisher/subscriber mechanism allowing an arbitrary set of devices (subscribers) to register themselves to be notified about information published by another device (publisher).

CIP Notification Layer—specifies behavior of notifications such as CIP alarms and events. This layer utilizes the CIP dynamic publisher subscriber mechanism for delivering of information about current states of CIP alarms and events to subscribers.

The infrastructure allows devices supporting the CIP protocol to be notified about occurrence of some specific events (i.e., controller events, alarms) generally called alerts published by a CIP publisher. Consequently, CIP alert publishers can send alert data to registered CIP subscribers. The infrastructure also provides services which allow the subscribers to register and acknowledge (if necessary) alerts published by CIP publisher, and to obtain their current status. Alert is a general abstract term representing a possible occurrence detectable by a publisher which can be of interest to the subscribers. Generally, publisher/subscriber communication is based on a model where nodes are publishing and subscribing to data. A network device can be a publisher, a subscriber, or both. A publisher can send the same data to many registered subscribers.

Figure 17:
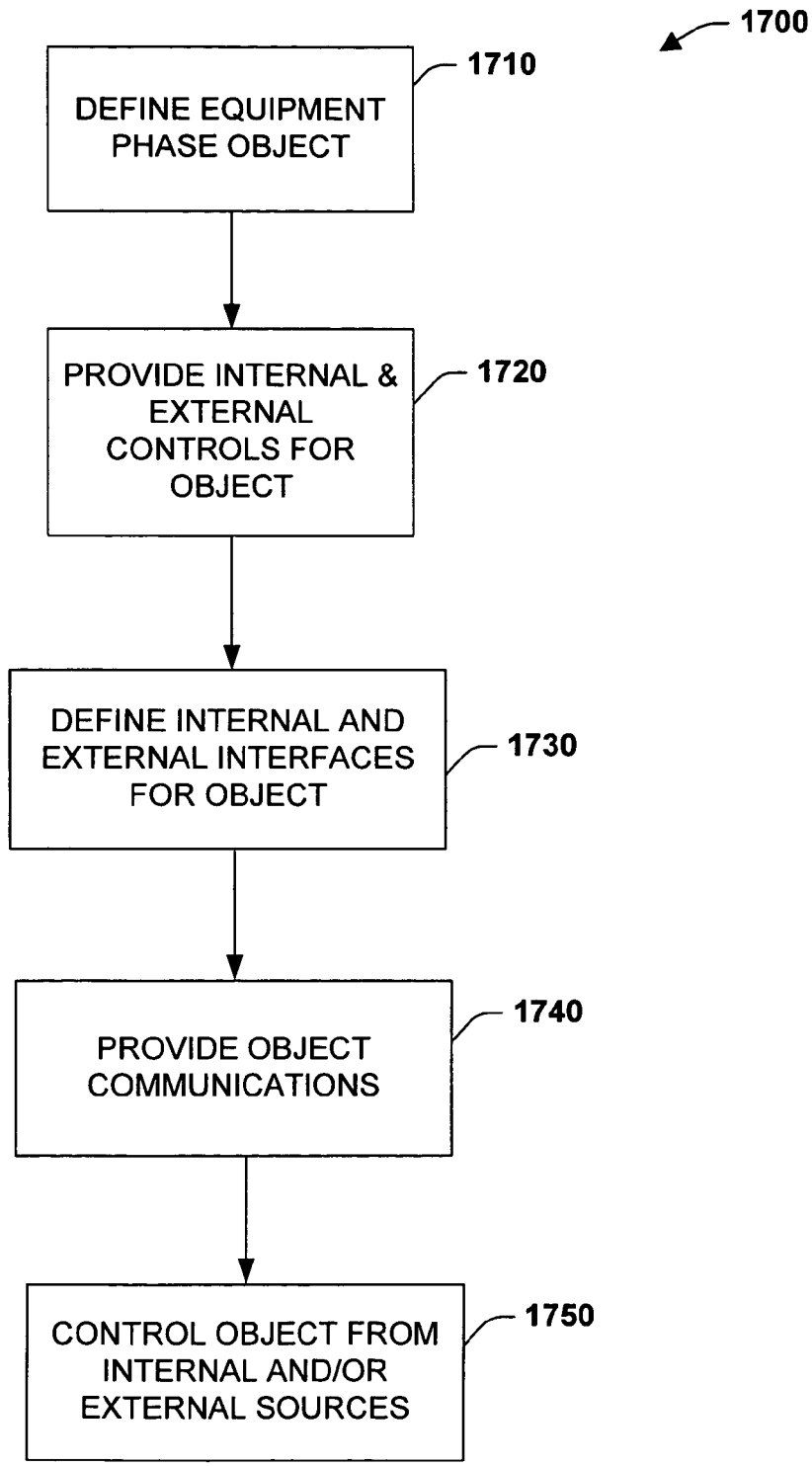
FIG. 17 is a flow diagram illustrating sequence-driven processing in accordance with an aspect of the present invention.

FIG. 17 illustrates a sequence driven methodology 1700 in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 1710 of the process 1700, one or more equipment phase objects are defined. Such objects can include various functionalities as previously described for managing associated states and interacting with various processes. At 1720, one or more internal and/or external controls are provided for the equipment phase object to enable internal process and/or external processes to control the object. For example, such controls can include instructions that cause the object to transition from one state to a subsequent state. At 1730, one or more internal and/or external interfaces can be defined for the object. Such interfaces allow entities such as users and/or machine to manipulate the object. This can include graphical user interfaces for controlling, configuring, and/or monitoring a respective object. At 1740, one or more communications options are provided to interact with the object and associated state machine. Such communications can include factory protocols such as CIP or more general protocols such as TCP/IP. Also, respective protocols can be employed in the framework of a general notification architecture, wherein events are published by a provider and subscribed to from a recipient. At 1750, after the above communications, controls, and interfaces are defined, the object can be controlled from instructions internal to a controller and/or controlled from a sequencer or other type machine that communicates over a network to the controller wherein the object resides.

Figure 18:
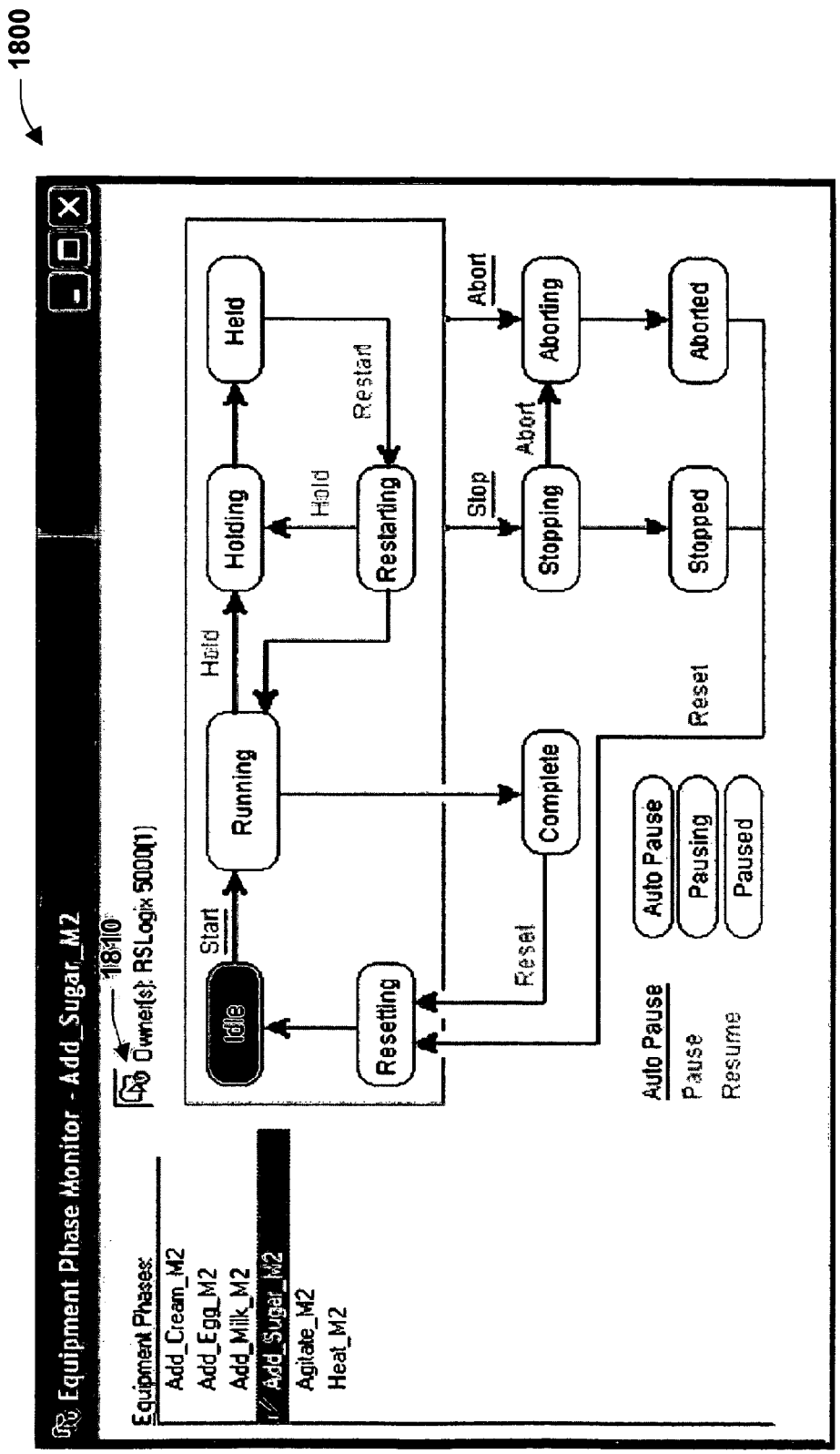
FIG. 18 is an example user interface for monitoring equipment phases in accordance with an aspect of the present invention.
Figure 19:
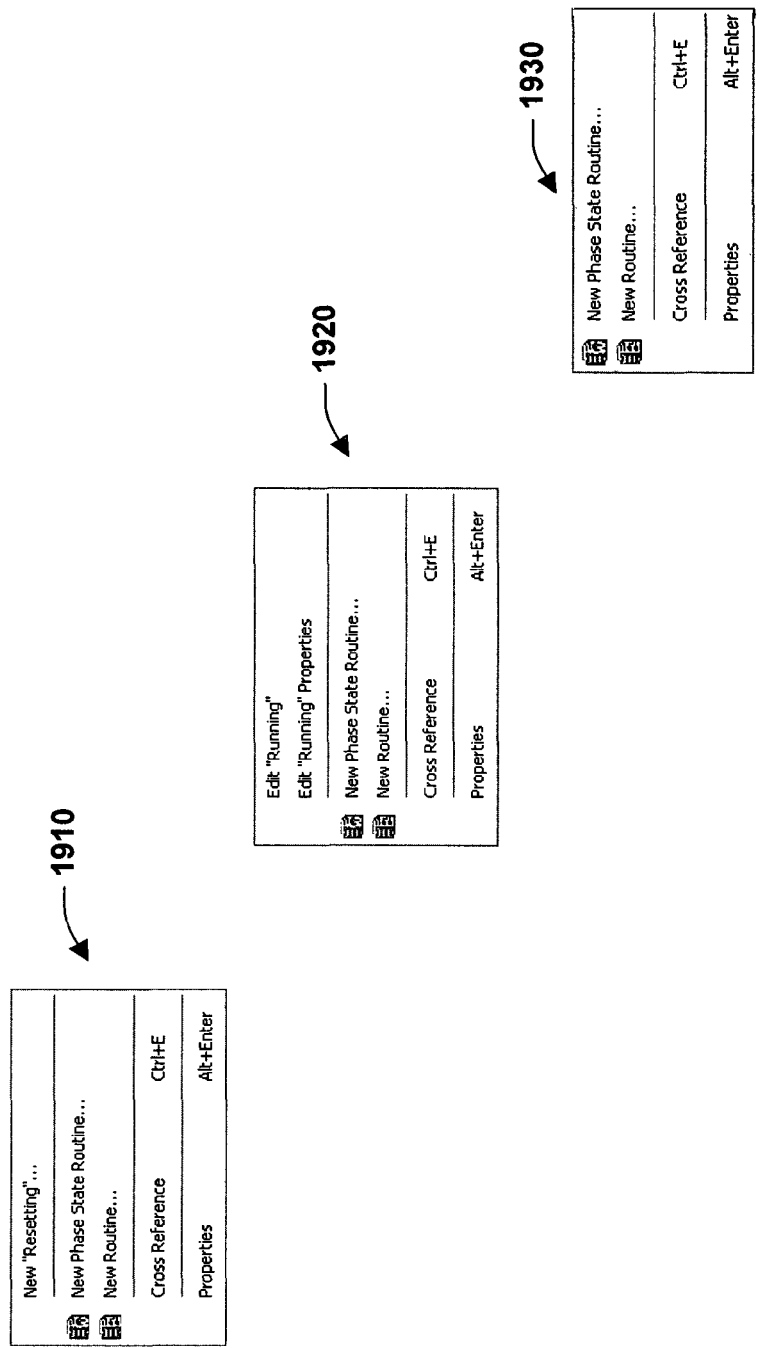
FIG. 19 illustrates example context menus in accordance with an aspect of the present invention.

FIG. 18 is an example user interface 1800 for monitoring and sequencing equipment phases in accordance with an aspect of the present invention. FIG. 19 illustrates context menus 1900 that may be employed in accordance with the interface 1800. Various aspects of the interface 1800 include:
- A user can request ownership directly from the graphic.
- Phases can be commanded/sequenced directly from the graphic.
- The graphic shows the types of owners and the number of owners for each phase.
- The user can navigate directly to logic from the graphic through a menu or double click, however it is to be appreciated not that other navigation mechanisms are possible.
- The user can create logic for unimplemented states directly from the graphic through a menu or double click, however it is to be appreciated that other navigation mechanisms are possible.
- The graphic is re-sizeable and retains its proportions. Thus, it can be used in conjunction with developing/debugging logic as well as in a large format for easy viewing across a control room, for example.

With the Equipment Phase Monitor toolbar described above, users are generally allowed to monitor and command an Equipment Phase from within an open Equipment Phase State routine. Launched from a top-level menu or Controller Organizer's context menu, an Equipment Phase Monitor window such as depicted by the interface 500 allows users to monitor and command all Equipment Phases within the opened project.

| Feature | Description |
| --- | --- |
| MDI Child | The Equipment Phase Monitor window is a MDI child window that automatically closes when the project is closed and updates as changes occur to Equipment Phases.<br>This window contains a list of Equipment Phases to monitor/command and a graphic that displays the state/commands for the selected Equipment Phase. Along with the MDI child window title ("Equipment Phase Monitor"), the title also displays which Equipment Phase is currently being monitored (e.g., Add Cream). If no Equipment Phases are being monitored, the window title merely reads "Equipment Phase Monitor". |
| Equipment Phase List | This single selection alphabetically sorted list of Equipment Phases displays the list of Equipment Phases to monitor. The Equipment Phase that's being monitored is the currently selected Phase within this list. Thus, selecting a different Equipment Phase stops monitoring one and starts monitoring the newly selected one. A Tooltip can be displayed when hovering the mouse over a particular Equipment Phase. |
| Owning an Equipment Phase | From the Equipment Phase Monitor window, users can view who owns and takes owner ship of one or more Equipment Phases.<br>The list of current owners is shown as a comma separated list to the right of the Take Ownership button 510. Pressing the Take Ownership Button at 510 allows users to take ownership of the Equipment Phase currently selected in the Equipment Phase List<br>Attaching to an inhibited or unscheduled Equipment Phase or an equipment phase in a task that is inhibited is not allowed. But, taking ownership of an inhibited Equipment Phase is allowed as users may want to control the Equipment Phase when un-inhibiting it. |
| Equipment Phase State Graphic | The Equipment Phase State graphic shows the current state of the selected Equipment Phase by highlighting the current state.<br>When Phase Monitor window resizes the Phase State Graphic, the graphic display is scaled to fit the new size. Thus, making the MDI child bigger increases the size of the state graphic (like zooming in).<br>For the commands that are shown as URL links, the cursor (when it is over the link) is changed to be the pointing hand. This signifies to users that they can click on the command.<br>Right mouse clicking on the State Graphic displays the following context menus depicted at 1410, 1420, and 1430 of FIG. 14.<br>Clicking on an Equipment Phase State when an Equipment Phase is being monitored and the particular state is not implemented see interface 1410. |

-continued

| Feature | Description |
|---|---|
| | Clicking on an Equipment Phase State when an Equipment Phase is being monitored and the particular state is implemented see interface 1420.
Clicking anywhere else or when no Equipment Phase is being monitored see interface 1430.
The Cross Reference and Properties menu items both work off of current |
| Commanding Equipment Phases | If an Equipment Phase is owned, and a particular state is allowed to be sent, the state is shown like a blue URL link. In this case, clicking the state graphic sends the command to the currently monitored Equipment Phase. If the command fails an error message is displayed explaining why the command failed. |

What have been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system that facilitates providing subscribers with associated alert notifications within an industrial environment, comprising:
   a processor;
   a memory communicatively coupled to the processor, the memory having stored therein computer-executable instructions configured to implement the system, including:
      receiving software configured to interface with an industrial controller; and
      alert management software configured to receive a command from a subscribing entity to instantiate an instance of a notify object class within the industrial controller, the instance of the notify object class having a set of class instance attributes including at least an Alert Type attribute specifying a type of Alert object to which the subscribing entity is subscribing and a Notify Timeout attribute,
   wherein the instance of the notify object class is configured to receive an alert notification from the industrial controller and convey the alert notification to the subscribing entity in response to generation of the alert notification by an Alert object corresponding to the type specified by the Alert Type attribute, and
   wherein the instance of the notify object class is configured to delete automatically after a connection between the subscribing entity and the instance has been closed for an amount of time specified by the Notify Timeout attribute.

2. The system of claim 1, wherein the alert management software is configured to execute within the industrial controller.

3. The system of claim 1, wherein the instance of the notify object class has a set of associated services that facilitate at least one of subscription to receive the alert notification, cancellation of a subscription the alert notification, refreshment of alert related information, or acknowledgement of the alert notification.

4. The system of claim 1, wherein the instance of the notify object class is configured to subscribe to receive the alert notification from the Alert object via a subscription object.

5. The system of claim 1, wherein the notify object class has a set of associated class attributes including at least a Revision attribute indicating a revision of object class definition and a Number of Instances attribute indicating a number of created instances of the notify object class.

6. The system of claim 1, wherein the instance of the notify object class is a Control and Information Protocol (CIP) object employed in an alert and subscription architecture, and wherein the architecture is a CIP based architecture that includes:
   a CIP layer that corresponds to a specification of the CIP;
   a CIP Dynamic Publisher/Subscriber Layer that defines a dynamic publisher/subscriber mechanism that allows a subscriber to register to be notified about information published by a publisher; and
   a CIP Notification Layer that specifies a behavior of the alert notification.

7. A system that facilitates alert notification in connection with an industrial control system, comprising:
   a processor;
   a memory communicatively coupled to the processor, the memory having stored therein computer-executable instructions configured to implement the system, including:
      subscription software configured to accept, from a subscribing host, a subscription to receive an alert notification that meets an alert criterion, the alert notification associated with a respective alert in an industrial controller, wherein the subscription software is further configured to invoke an instance of a notify object class defined within the industrial controller in response to acceptance of the subscription and to employ the instance of the notify object class to subscribe the subscribing host to receive the alert notification, the instance of the notify object class having a plurality of class instance attributes including at least an Alert Type attribute specifying a type of Alert object to which the subscribing host is subscribing and a Notify Timeout attribute;
      interface software configured to interact with the industrial controller to receive the alert notification; and
      distribution software configured to provide the alert notification to the subscribing host in response to a determination that the alert notification corresponds to the Alert object specified by the Alert Type attribute, the distribution software configured to combine multiple alert notifications into a single packet,
   wherein the instance of the notify object class is configured to delete automatically after a connection between the subscribing entity and the instance of the notify object class has been closed for a predetermined amount of time, the predetermined amount of time specified by the Notify Timeout attribute.

8. The system of claim 7, wherein the distribution component is a dynamic publisher.

9. The system of claim 7, wherein the alert criterion relates to an occurrence detectable by a publisher determined to be relevant to at least one of the industrial controller or the subscribing host.

10. The system of claim 7, wherein the alert is defined in the industrial controller by at least one of a data table structure or an instruction.

11. The system of claim 7, wherein the instance of the notify object class is configured to implement an associated Unsubscribe service that allows the subscribing host to unsubscribe from receiving the alert notification.

12. The system of claim 7, wherein the instance of the notify object class is configured to implement an associated Refresh service that refreshes notification related information.

13. The system of claim 7, wherein the instance of the notify object class is configured to implement an associated Acknowledge_Alert service that acknowledges the alert notification.

14. The system of claim 7, wherein the instance of the notify object class is a Control and Information Protocol (CIP) object employed in an alert and subscription architecture, the architecture is a CIP based architecture that includes:
   a CIP layer that corresponds to a specification of the CIP;
   a CIP Dynamic Publisher/Subscriber Layer that defines a dynamic publisher/subscriber mechanism that allows a subscriber to register to be notified about information published by a publisher; and
   a CIP Notification Layer that specifies a behavior of the alert notification.

15. A method that facilitates alert notification distribution in an industrial environment, comprising:
   defining a notify object class within an industrial controller;
   invoking an instance of the notify object class having a set of associated class instance attributes including at least an Alert Type attribute specifying a type of Alert object from which alert notifications are to be received, wherein the invoking the instance includes invoking an instance employed in a Control and Information Protocol (CIP) based architecture;
   employing the instance of the notify object class to subscribe to receive an alert notification associated with an alert declared in the industrial controller and generated by the Alert object type specified by the Alert Type attribute; and
   automatically deleting the instance of the notify object class after a connection between the instance and a subscribing entity is closed for a predetermined amount of time defined by a Notify Timeout attribute associated with the instance.

16. The method of claim 15, further comprising unsubscribing from the Alert object using an Unsubscribe service associated with the instance of the notify object class.

17. The method of claim 15, further comprising refreshing notification related information using a Refresh service associated with the instance of the notify object class.

18. The method of claim 15, further comprising acknowledging a notification using an Acknowledge_Alert service associated with the instance of the notify object class.

19. The method of claim 15, further comprising receiving the alert notification from a CIP-based architecture that includes a CIP layer that corresponds to a specification of the CIP, a CIP Dynamic Publisher/Subscriber Layer that defines a dynamic publisher/subscriber mechanism that allows a subscriber to register to be notified about information published by a publisher, and a CIP Notification Layer that specifies a behavior of the alert notification.

20. A computer-readable memory having stored thereon computer-executable instructions that, in response to execution, cause a computer to perform operations, comprising:
   invoking an instance of a notify object class having a plurality of class instance attributes including at least an Alert Type attribute specifying a type of Alert object in an industrial controller from which to receive an event notification;
   subscribing to receive the event notification from the specified type of Alert object via the instance of the notify object class in a system that is employed in an alert and subscription architecture;
   receiving the event notification in response to generation of the event notification by an Alert object corresponding to the type specified by the Alert Type attribute; and
   associating the instance of the notify object class with a notify timeout value that specifies an amount of time subsequent to disconnecting from the instance of the notify object class after which the instance of the notify object class will be automatically deleted.

21. The computer-readable memory of claim 20, wherein the alert and subscription architecture is a Control and Information Protocol (CIP) based architecture that includes a CIP layer that corresponds to a specification of the CIP, a CIP Dynamic Publisher/Subscriber Layer that defines a dynamic publisher/subscriber mechanism that allows a subscriber to register to be notified about information published by a publisher, and a CIP Notification Layer that specifies a behavior of the alert notification.

* * * * *